US010172373B2

(12) United States Patent
Kolar et al.

(10) Patent No.: US 10,172,373 B2
(45) Date of Patent: Jan. 8, 2019

(54) MODULAR BLENDING SYSTEM

(71) Applicant: Vita-Mix Corporation, Olmsted Township, OH (US)

(72) Inventors: David J. Kolar, Stow, OH (US); Joseph Hobbs, Olmsted Township, OH (US); Susan Mayer, Olmsted Township, OH (US); Fred Mehlman, Brunswick, OH (US); Richard D. Boozer, Wakeman, OH (US); Casey Zale, Olmsted Township, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 278 days.

(21) Appl. No.: 14/061,103

(22) Filed: Oct. 23, 2013

(65) Prior Publication Data
US 2014/0109770 A1 Apr. 24, 2014

Related U.S. Application Data

(60) Provisional application No. 61/717,336, filed on Oct. 23, 2012, provisional application No. 61/786,720, filed on Mar. 15, 2013.

(51) Int. Cl.
*A47J 31/00* (2006.01)
*A47J 31/40* (2006.01)
*A23G 9/30* (2006.01)
*A23G 9/04* (2006.01)
*A23G 9/22* (2006.01)

(52) U.S. Cl.
CPC .............. *A23G 9/30* (2013.01); *A23G 9/045* (2013.01); *A23G 9/22* (2013.01); *A47J 31/00* (2013.01); *A47J 31/40* (2013.01); *A47J 31/402* (2013.01); *A47J 31/407* (2013.01)

(58) Field of Classification Search
CPC .......... A47J 31/00–31/02; A47J 31/40–31/462
USPC ................................ 99/275–287, 289 R–323
See application file for complete search history.

(56) References Cited

U.S. PATENT DOCUMENTS

| | | | | |
|---|---|---|---|---|
| 4,479,423 A | * | 10/1984 | Schwitters | A23G 9/305 426/522 |
| 5,405,052 A | * | 4/1995 | Sawyer, III | B67D 3/0009 222/146.6 |
| 5,957,557 A | * | 9/1999 | Langer | A47B 77/08 220/4.02 |
| 6,068,875 A | | 5/2000 | Miller et al. | |
| 6,126,983 A | | 10/2000 | Miller | |
| 6,554,164 B1 | | 4/2003 | Jones | |

(Continued)

OTHER PUBLICATIONS

International Search Report and the Written Opinion of the International Searching Authority, PCT/US13/66377, Vita-Mix Corporation, dated May 15, 2014.

Primary Examiner — Michael Laflame, Jr.
(74) Attorney, Agent, or Firm — McDonald Hopkins LLC

(57) ABSTRACT

A modular blending system is shown and described. The modular blending system may include a storage device capable of storing a plurality of flavoring products, and an ice shaving mechanism removably attached to the storage device, the ice shaving mechanism including an ice dispenser. The modular blending system may also include a fluid dispensing unit in fluid communication with the flavoring products, where the fluid dispensing unit is separate from the ice dispenser.

30 Claims, 17 Drawing Sheets

(56) References Cited

U.S. PATENT DOCUMENTS

| | | |
|---|---|---|
| 6,730,348 B2 | 5/2004 | Miller et al. |
| 6,860,764 B2 | 3/2005 | Khoury |
| 7,048,217 B2 | 5/2006 | Dickson, Jr. et al. |
| 7,207,506 B1 | 4/2007 | Dickson, Jr. et al. |
| 7,942,094 B2 * | 5/2011 | Kounlavong .......... A23G 9/045 222/135 |
| 8,074,837 B2 | 12/2011 | Nevarez et al. |
| 2007/0068393 A1 * | 3/2007 | Nosler .................. A47J 31/007 99/279 |
| 2010/0139493 A1 | 6/2010 | Nevarez et al. |
| 2010/0145522 A1 | 6/2010 | Claesson et al. |
| 2010/0242497 A1 | 9/2010 | Bertone |
| 2010/0314410 A1 | 12/2010 | Nevarez et al. |
| 2010/0318225 A1 | 12/2010 | Claesson et al. |
| 2010/0323071 A1 | 12/2010 | Nevarez et al. |
| 2011/0023505 A1 | 2/2011 | Popov et al. |
| 2011/0061420 A1 | 3/2011 | Anderson et al. |
| 2011/0073618 A1 | 3/2011 | Anderson et al. |
| 2011/0168738 A1 | 7/2011 | Nevarez et al. |
| 2011/0189358 A1 | 8/2011 | Herbert |
| 2012/0269936 A1 | 10/2012 | Claesson et al. |

* cited by examiner

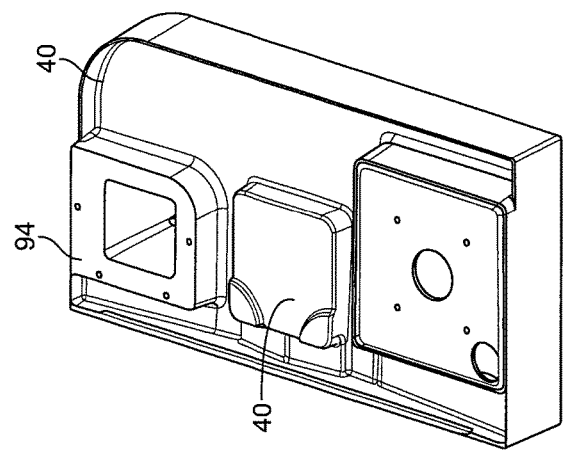
FIG. 9
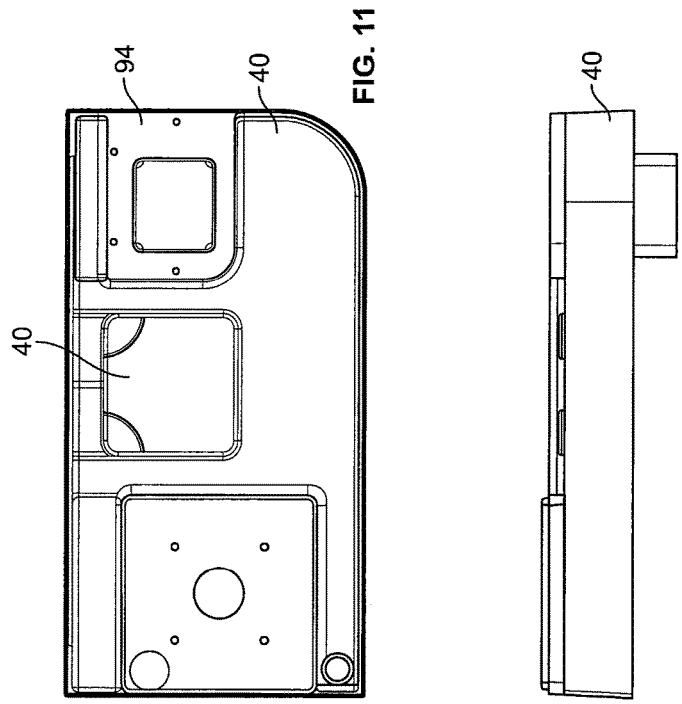
FIG. 11
FIG. 10

330

323

330

323

327

MODULAR BLENDING SYSTEM

CROSS-REFERENCE TO RELATED APPLICATION

This application claims the benefit of U.S. Provisional Patent Application No. 61/717,336, entitled "Modular Blending System," filed on Oct. 23, 2012 and U.S. Provisional Patent Application No. 61/786,720, entitled "Lifting Mechanism," filed on Mar. 15, 2013, both of which are hereby incorporated in its entirety by reference.

FIELD OF THE INVENTION

The present invention is generally related to a blending system and, more particularly, to a modular blending system with selectively attached discrete components.

BACKGROUND

Blending systems are often utilized to create iced beverages, desserts and a wide variety of other food items. Commercial establishments use these blending systems to create these various food items. Typical blending systems include an ice shaving apparatus, flavor dispenser, blender and refrigeration system. Operators will utilize the blending system to shave ice, add flavoring and in some situations further blend the combination. These steps create the applicable food item.

In operation of such systems the ice shaver reduces larger ice cubes into small ice shavings. Next some kind of flavoring is dispensed into the shaved ice. The flavoring may be any sort of flavoring, including, without limitation, fruit juices, pureed fruit, coffee, and any other applicable flavoring. Once the operator adds the flavoring to the shaved ice, the combination may be blended together to further mix such. This may create a smooth drinkable combination.

The components of such blending systems are typically integrally formed i.e., the components are fixedly attached together. Moreover, in prior art blending systems the ice shaver and flavor dispenser are integral units whereby the contents of both are ultimately dispensed from a single dispenser.

Utilizing integrally formed components has several disadvantages. For example, if one of the components of the blending system fails to operate properly and it is unable to be repaired the entire blending system may have to be replaced as opposed to the single component. Further, cleaning the dispensing system with integrally formed components may be difficult. In such systems, one must disassemble as many of the components as feasible to clean. This may present additional challenges in that it is time consuming to disassemble and reassemble the components. Further still, the components in such systems are difficult to clean and may not come appropriately clean. As the components are intertwined, it may be difficult to reach certain components and appropriately clean such components. Also, cleaning such systems may require shutting down the entire system. This may result in all of the components being generally unavailable for use during the cleaning.

Another disadvantage is the combined dispenser for the ice and the flavoring. The combined use may make it difficult to appropriately clean the applicable dispenser. The combined dispenser may have remnants of prior flavoring used when dispensing ice. This may result in the ice not being pure.

Moreover, such blending systems often include a storage unit for storing flavorings or other liquid or puree foodstuffs to be mixed with the iced item. The storage unit may be a refrigerated unit or any unit configured to house the flavorings. Often storage units include racks for housing a plurality of different flavorings. Each rack may include one or more receptacles. Each receptacle may be configured to receive a flavoring container therein. For example, flavorings are often provided in a bag or a bag-in-box (BIB) packaging that may be placed within the receptacle and removed once the bag or flavoring container is empty and replaced with a new flavoring container.

Current designs for storage units commonly provide a level base for the box or bag of flavoring to rest on. The level base allows the flavoring container to rest evenly within the receptacle without the risk of tipping over or falling out of the receptacle. However, flavoring containers often fail to empty completely into the system and are often discarded before all the flavoring or liquid has been removed from the container. For example, some bags and other packaging are unable to fully drain the liquid into an engaging nozzle because the nozzle may be positioned above the bottom of the bag.

SUMMARY

A modular blending system is shown and described. The modular blending system may include a storage device capable of storing a plurality of flavoring products, and an ice shaving mechanism removably attached to the storage device, the ice shaving mechanism including an ice dispenser. The modular blending system may also include a fluid dispensing unit in fluid communication with the flavoring products, where the fluid dispensing unit is separate from the ice dispenser.

A modular blending system may include a refrigeration unit, an ice shaving mechanism selectively secured to the refrigeration unit, the ice shaving mechanism including an ice dispenser, and a blender selectively secured to the refrigeration unit. The modular blending system may also include a fluid dispensing unit in fluid communication with the refrigeration unit, wherein the fluid dispensing unit is separate from the ice dispenser.

A modular blending system may include a refrigeration unit, an ice shaving mechanism selectively secured to the refrigeration unit, the ice shaving mechanism including an ice dispenser, and a fluid dispensing unit in fluid communication with the refrigeration unit, where the fluid dispensing unit is separate from the ice dispenser. The modular blending system may also include at least one tube fluidly engaged with the fluid dispensing unit at one end and configured to fluidly engage with a dispensing receptacle at a second end where fluid from the dispensing receptacle is transferred through the tube to the fluid dispensing unit, and a cleaning system operatively coupled with the fluid dispensing and the tube, where the cleaning system utilizes gravity to evacuate the tube of cleaning fluids.

A method of cleaning a modular blending system may include the steps of attaching a cleaning system having a fixture and at least one tube with the modular blending system, inserting an end of the tube into a cleaning solution, and initiating operation of a pump. The method may also include the steps of pumping the cleaning solution into the tube through the fixture and into the modular blending system, soaking the modular blending system, initiating operation of the pump, and evacuating the cleaning solution from the modular blending system.

A tray configured to be selectively held within a storage device of a modular blending system may include a floor configured to be positioned within the storage device, at least one wall extending from the floor, and an opening in the at least one wall, the opening configured to receive a receptacle spout. The tray may also include a base plate movably secured with the floor, where the base plate moves relative to the floor to assist with evacuating fluid from a receptacle.

A tray configured to be selectively held within a storage device of a modular blending system, the tray may include a floor having a front portion and a rear portion, and at least one wall extending upward from the front portion of the floor. The tray may also include an aperture in the at least one wall, the aperture configured to receive a receptacle spout, and a base plate configured to pivot relative to the floor to assist with evacuating fluid from a receptacle positioned on the base plate, where the base plate pivots from a first position substantially parallel with the floor to a second position angled towards the front portion of the floor.

BRIEF DESCRIPTION OF THE DRAWINGS

The system may be better understood by reference to the following detailed description taken in connection with the following illustrations.

FIG. 9 is a perspective view of a drain tray with a support.

FIG. 10 is side view of a drain tray with a support.

FIG. 11 is a top view of a drain tray with a support.

DETAILED DESCRIPTION

Figure 1:
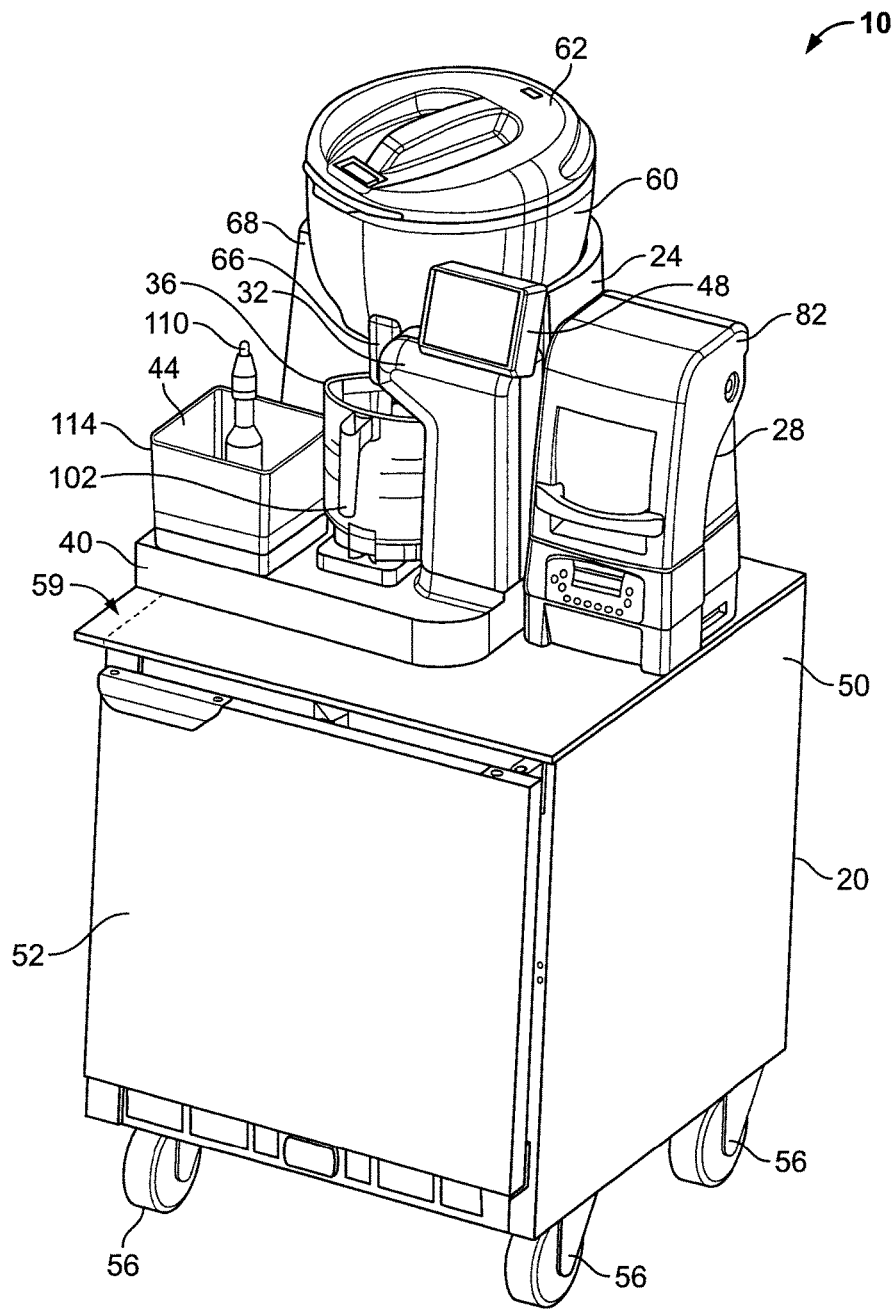
FIG. 1 is a perspective view of a modular blending system.
Figure 2:
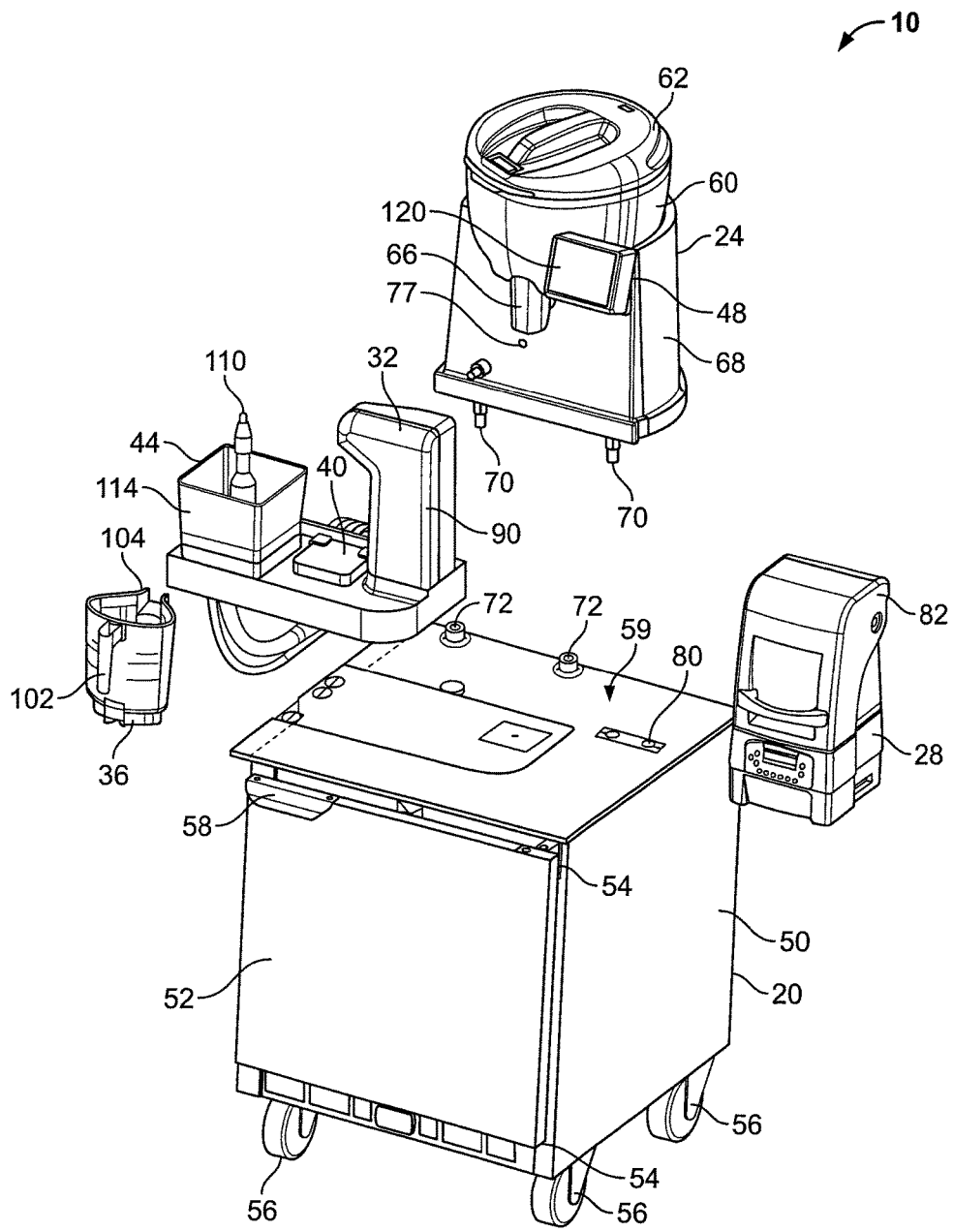
FIG. 2 is a partially exploded view of the modular blending system of FIG. 1.
Figure 3:
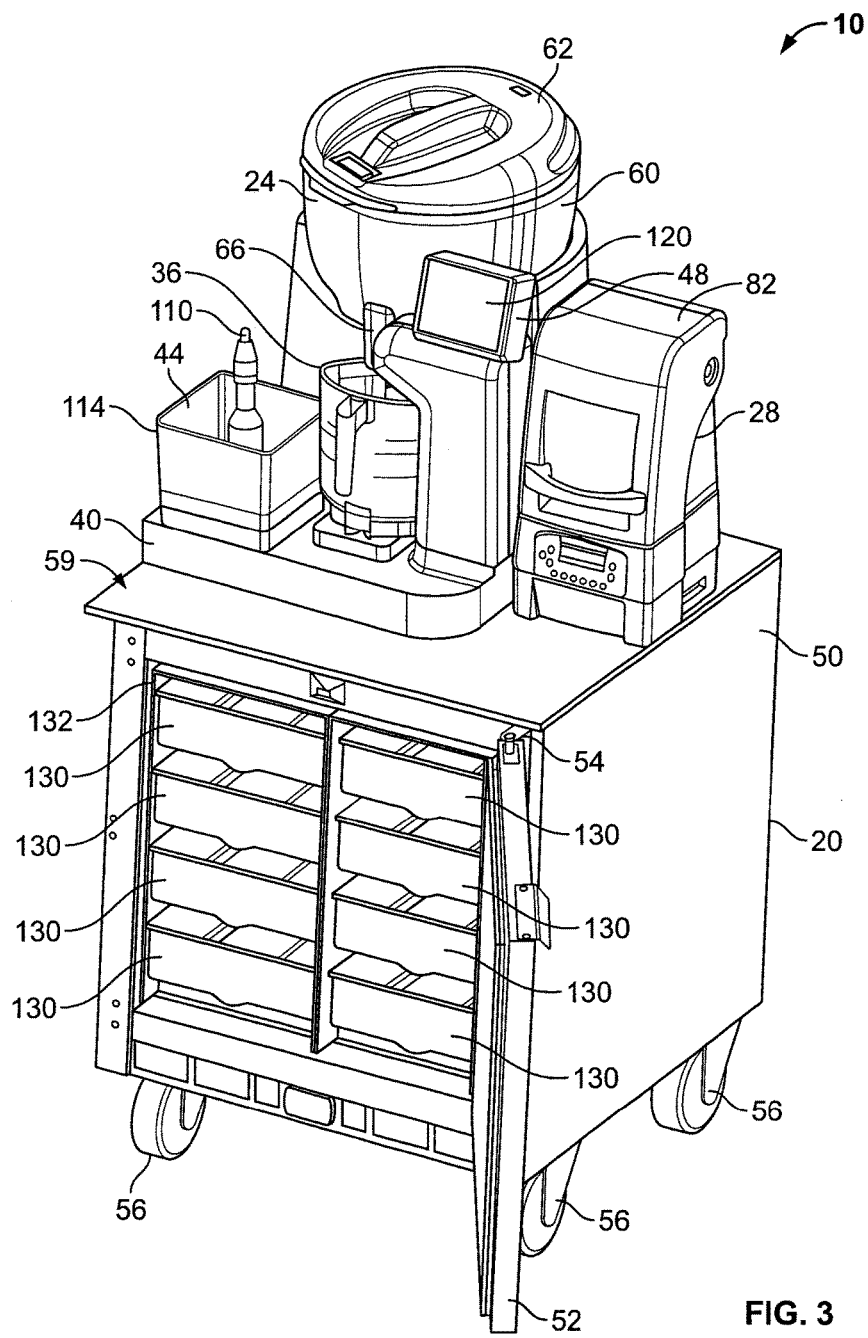
FIG. 3 is a perspective view of a modular blending system with a door of a refrigeration unit in an open position.
Figure 4:
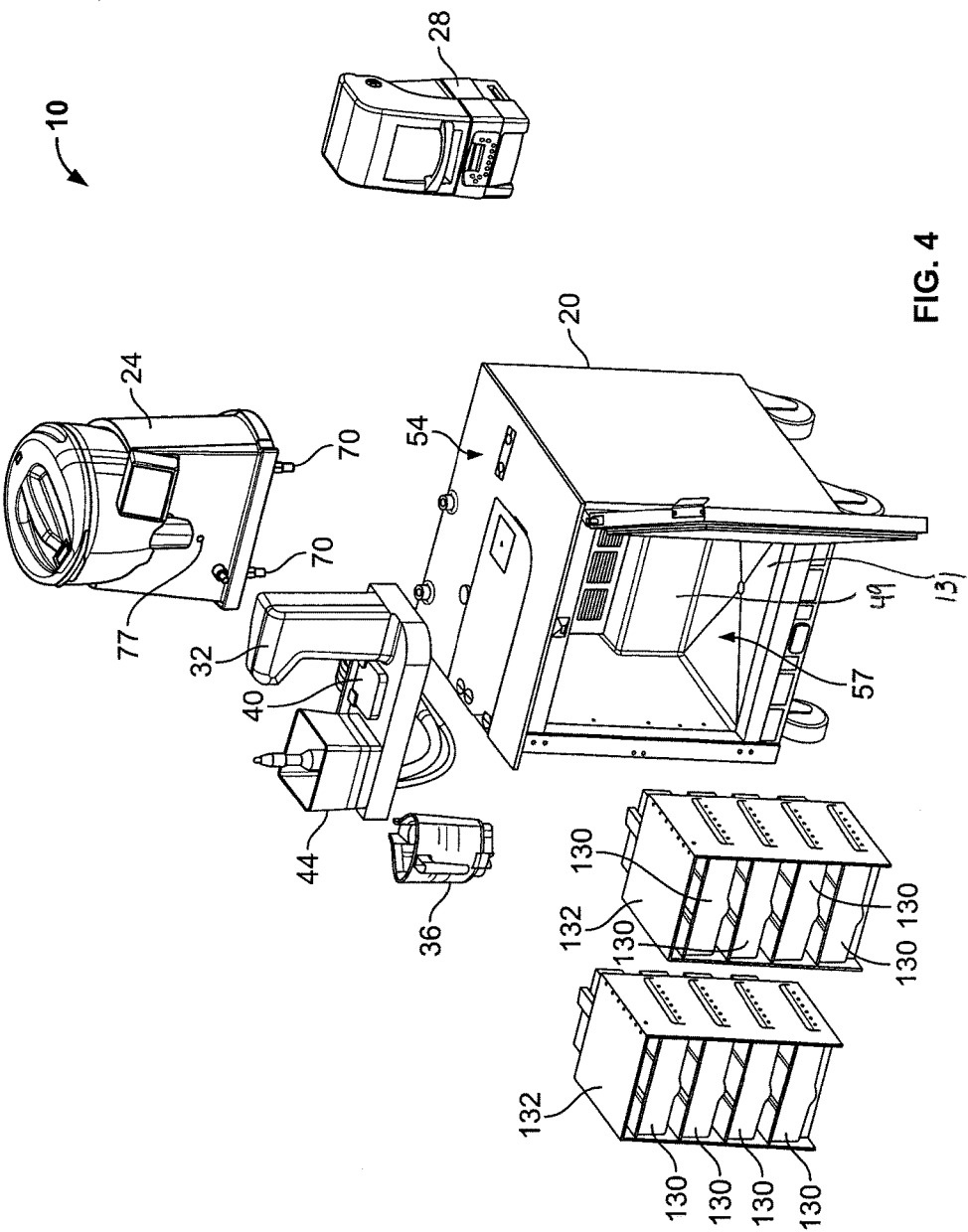
FIG. 4 is an exploded view of a modular blending system.
Figure 5:
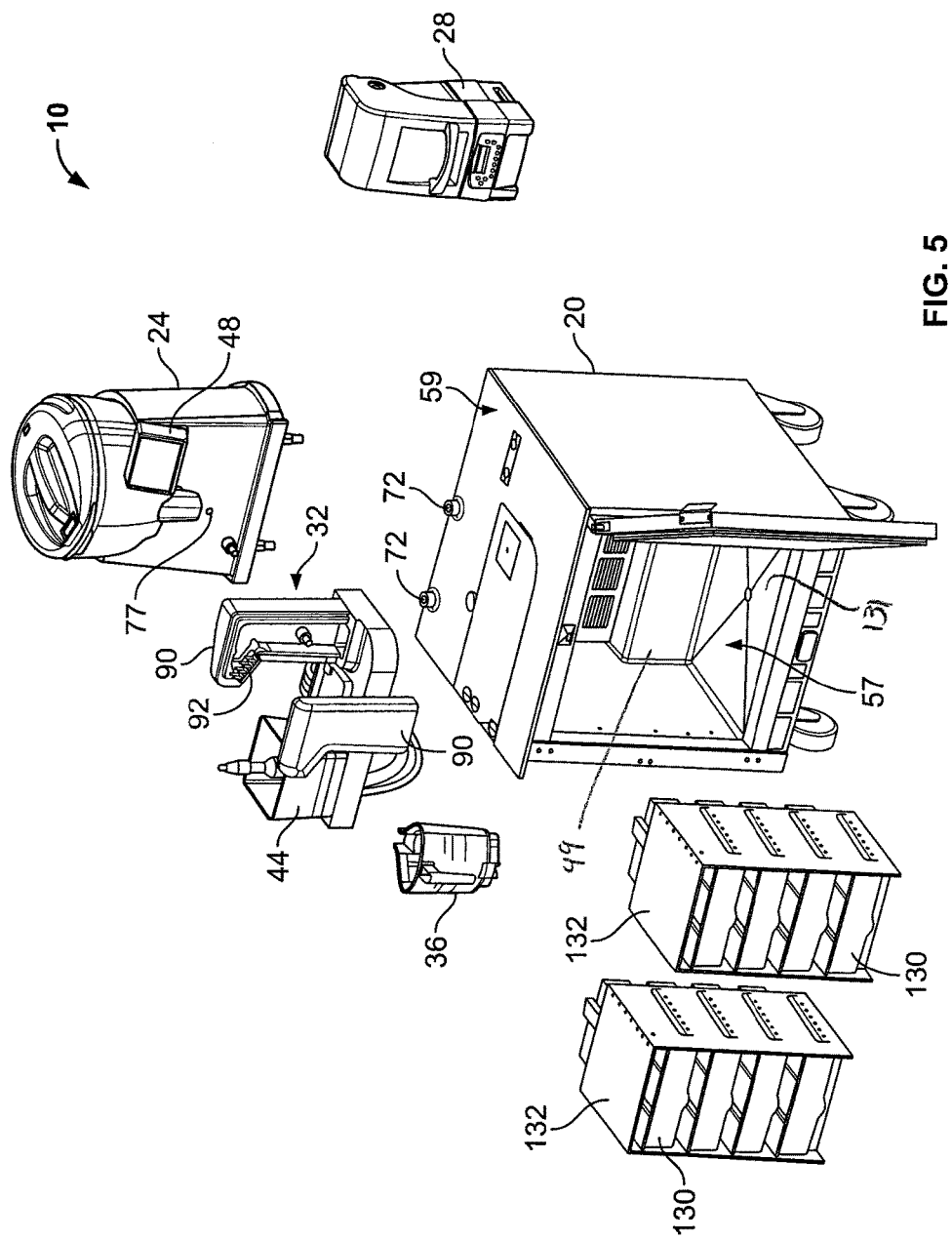
FIG. 5 is an exploded view of a modular blending system with a partially exploded view of a dispenser.
Figure 6:
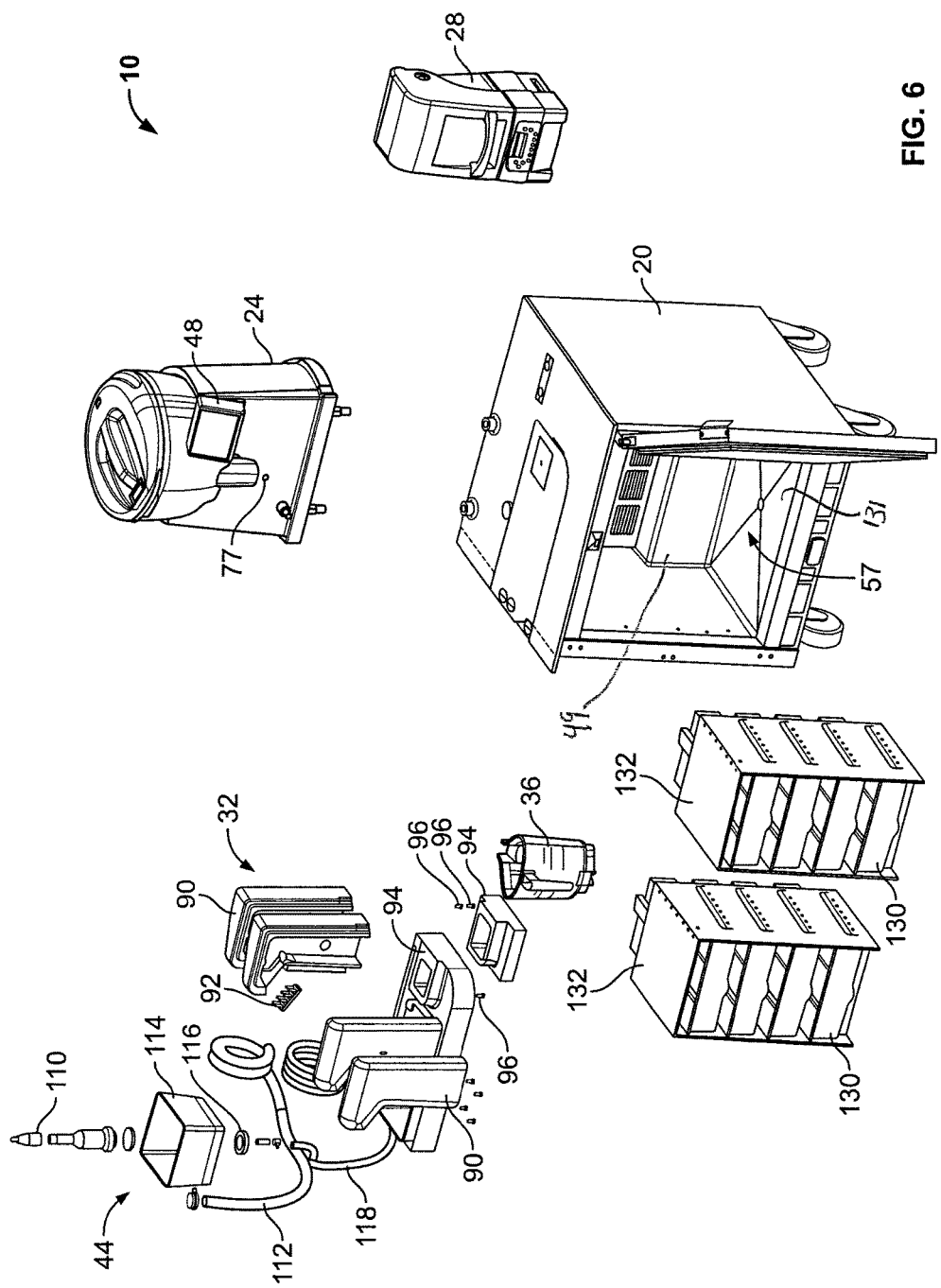
FIG. 6 is an exploded view of a modular blending system with an exploded view of a dispenser and container cleaner.
Figure 7:
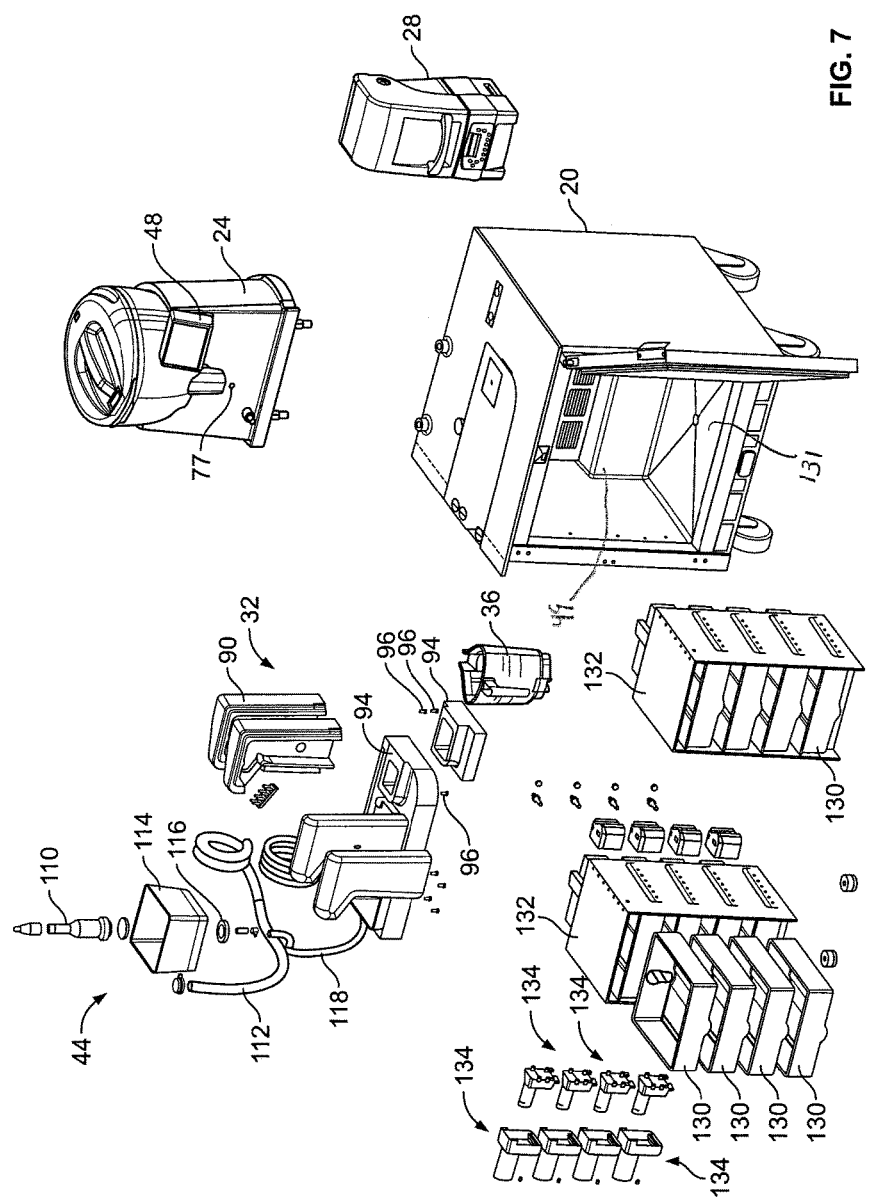
FIG. 7 is an exploded view of a modular blending system with an exploded view of a dispenser, container cleaner, and refrigeration unit dispensing portion.
Figure 8:
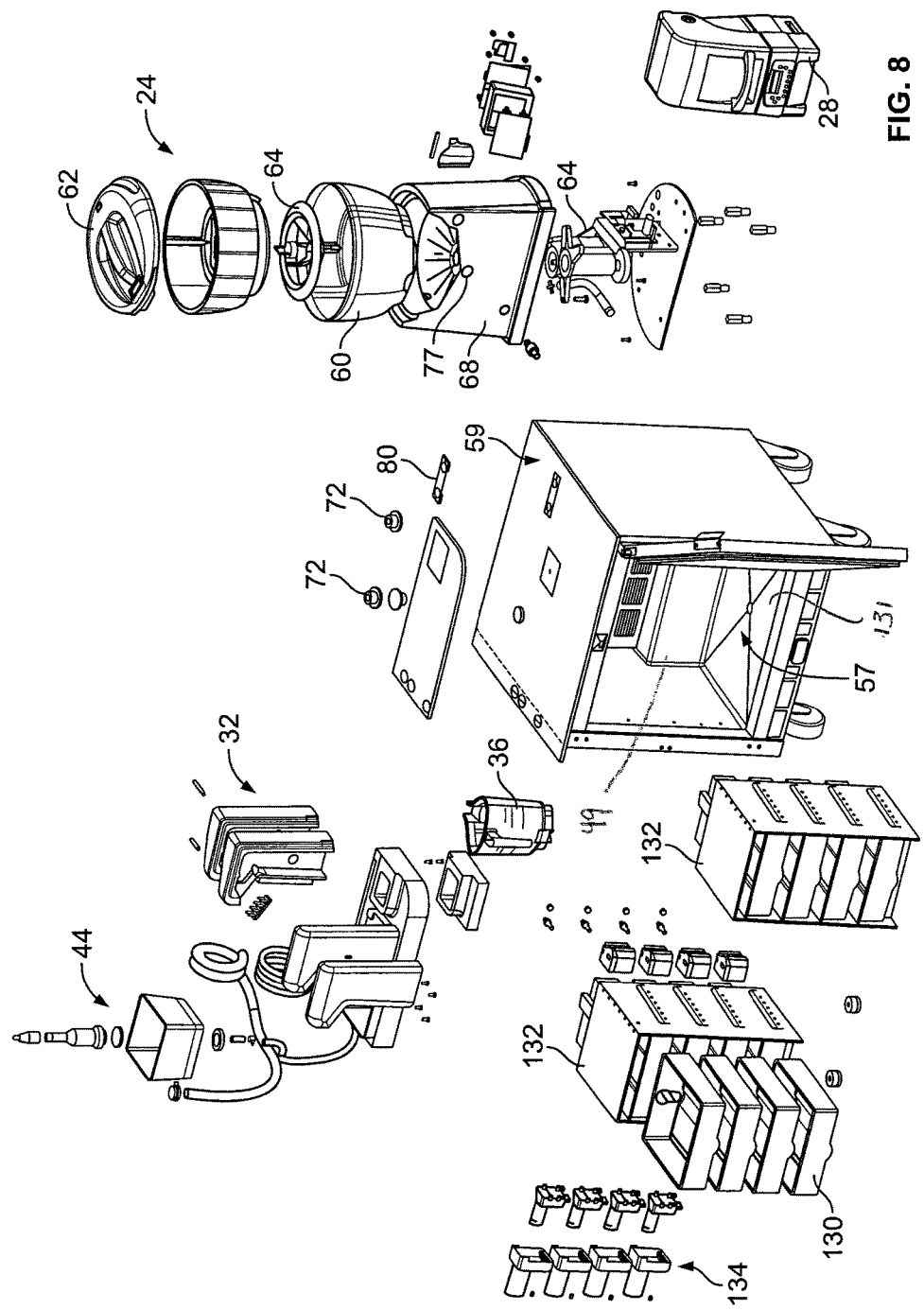
FIG. 8 is an exploded view of a modular blending system with further exploded views of a dispenser, container cleaner, refrigeration unit, and dispenser.
Figure 12:
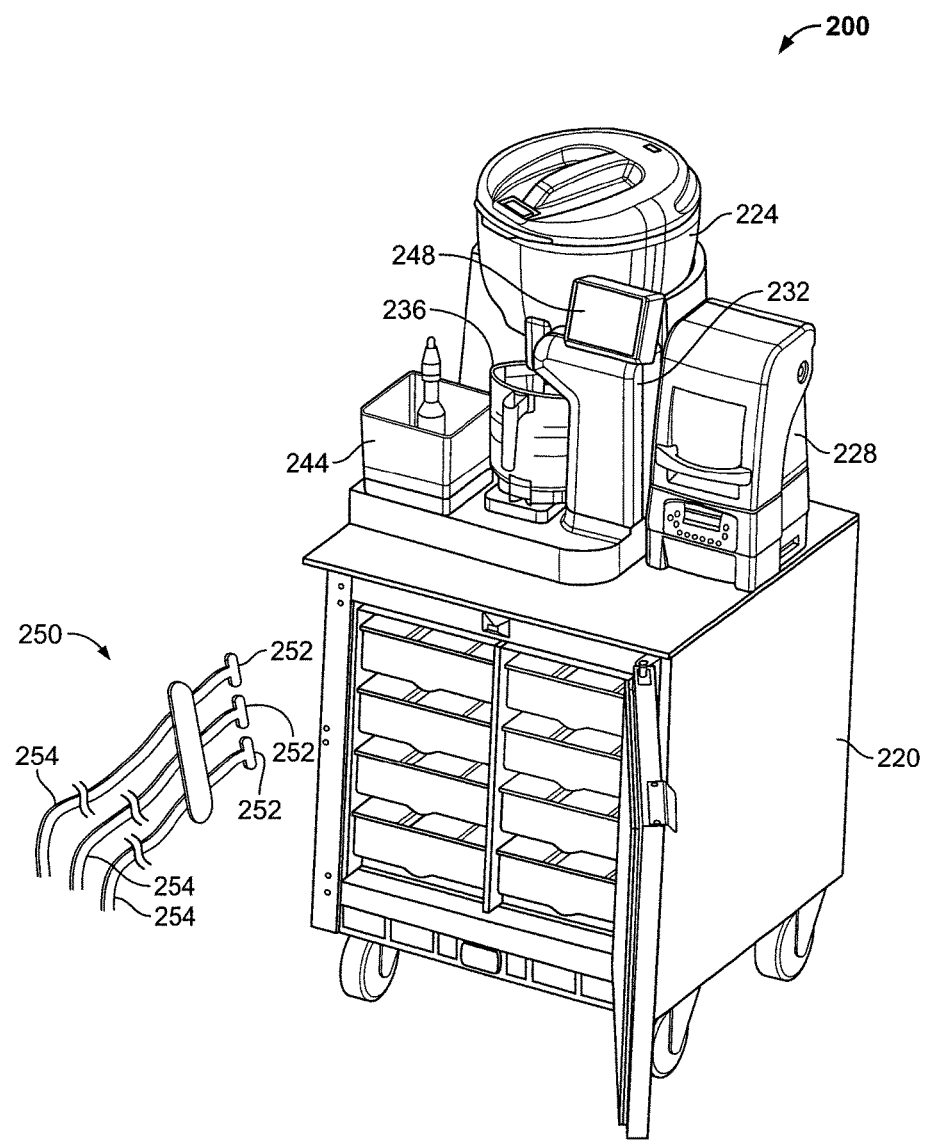
FIG. 12 is a perspective view of an alternative embodiment of a modular blending system with a door of a refrigeration unit in an open position.
Figure 13:
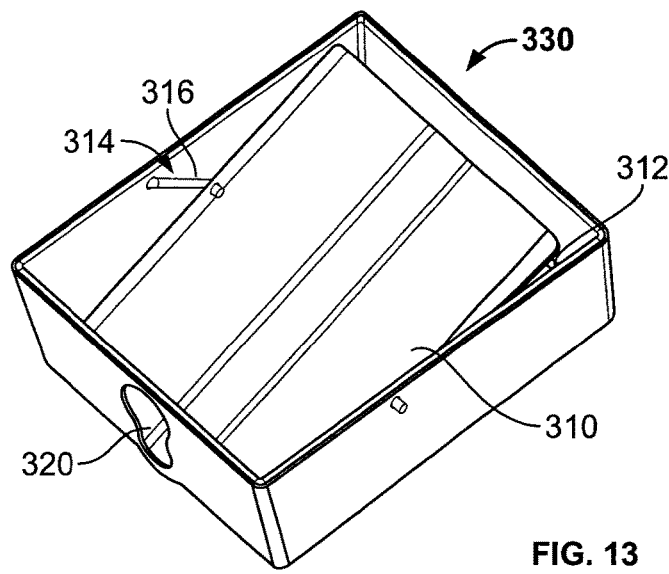
FIG. 13 is a perspective view of a tray for a storage unit of a modular blending system.
Figure 14:
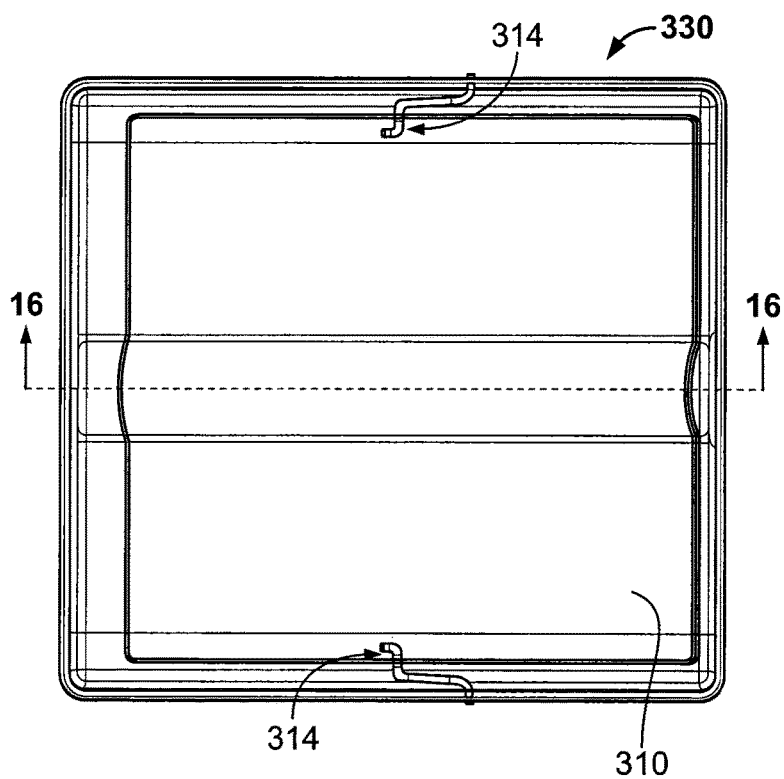
FIG. 14 is a top view of the tray of FIG. 13.
Figure 15:
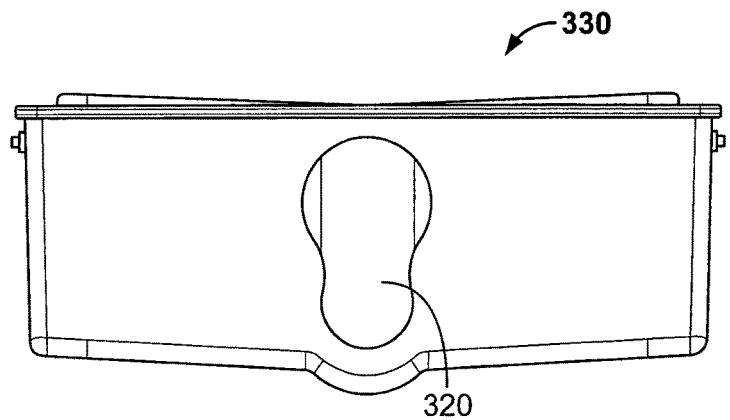
FIG. 15 is a front view of the tray of FIG. 13.
Figure 16:
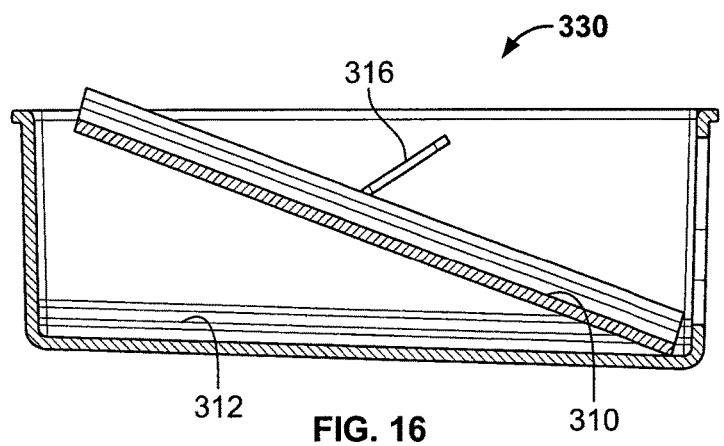
FIG. 16 is a cross-sectional view of the tray of FIG. 14 taken along line A-A.
Figure 17:
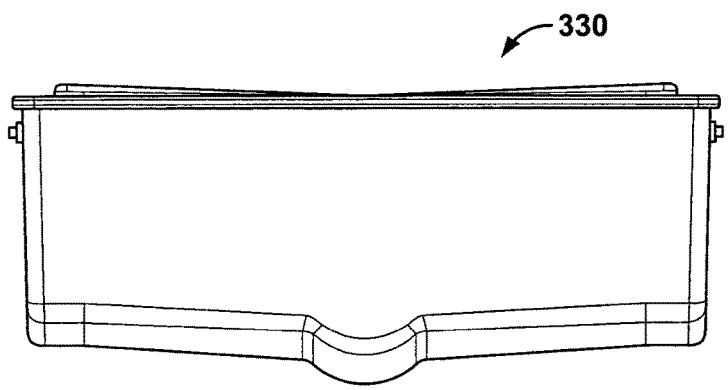
FIG. 17 is a rear view of the tray of FIG. 13.
Figure 18:
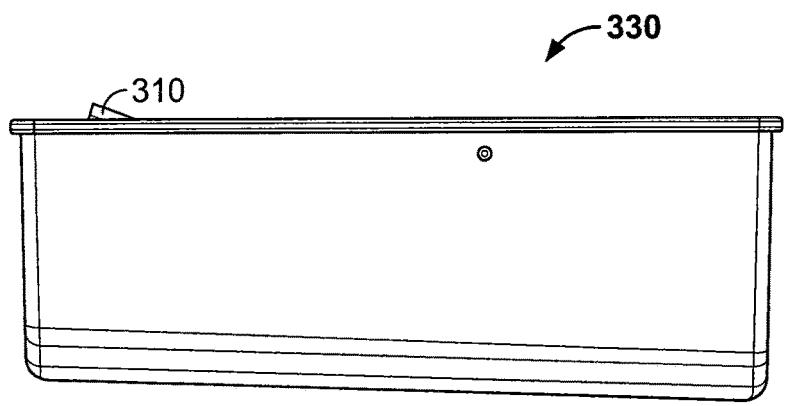
FIG. 18 is a side view of the tray of FIG. 13.
Figure 19:
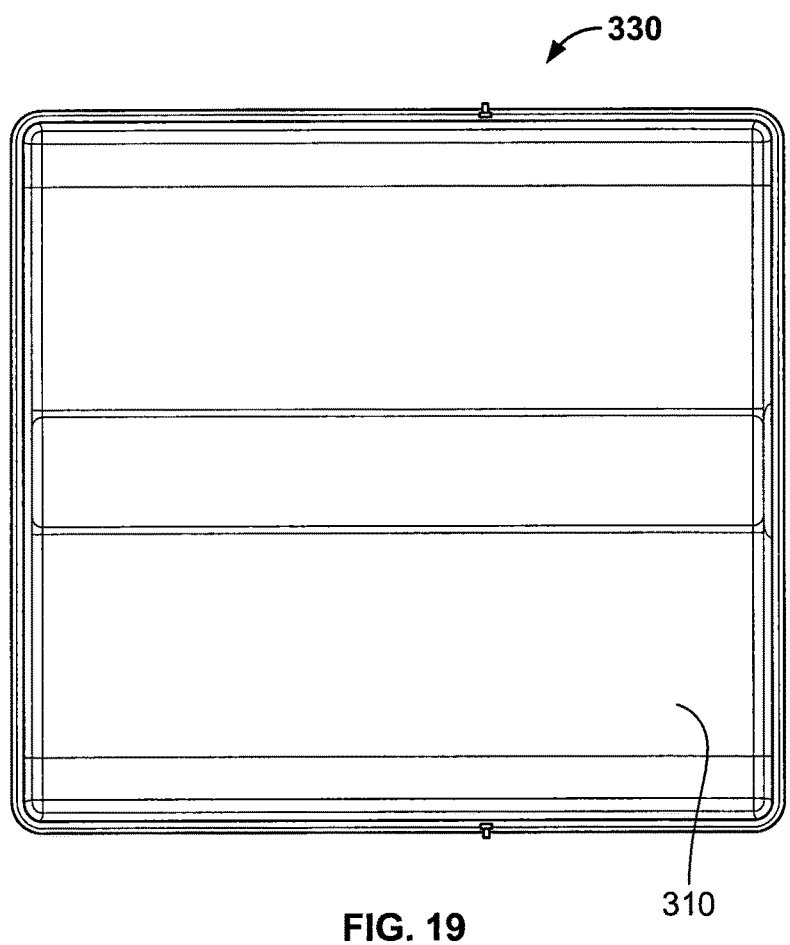
FIG. 19 is a bottom view of the tray of FIG. 13.

Reference will now be made in detail to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments.

A modular blending system 10 as shown in FIGS. 1-8 may include a refrigeration unit 20, an ice shaver 24, a blender 28, and a content dispenser 32. The modular blending system 10 may also include a container 36, a support 40, a container cleaner 44, and a graphical user interface 48. At least one of the aforementioned components may be modular with respect to the modular blending system 10. Alternatively, all of the components may be modular with respect to the modular blending system 10. Further still, any of the aforementioned components may be modular. The present teachings are not limited to a specific configuration and are not limited to the configurations depicted in the corresponding drawings. Any appropriate configuration and combination of modular components may be used without departing from the present teachings.

The refrigeration unit 20 of the modular blending system 10 may be of any appropriate configuration and is not limited to that shown and described. The refrigeration unit 20 may be an off-the-shelf standard refrigeration unit or may be a customized unit created specifically for the modular blending system 10. The refrigeration unit 20 may include a chiller 49—such as shown in FIGS. 4-8—of any appropriate configuration and a housing 50 formed of any appropriate insulative material. The combination of such may generally keep contents of the refrigeration unit 20 at a predetermined temperature. The refrigeration unit 20 may further include a door 52. The door 52 may be attached with the housing 50 in any appropriate manner, such as by way of a non-limiting example through use of hinges 54. The door 52 may be selectively openable and closeable relative to the housing 50. The door 52 may include a handle 58 such that the operator may grasp the handle 58 in opening or closing the door 52. The handle 58 may be positioned on a side of the door 52 generally opposite the hinges 54. The handle 58 may be of a shape and size to make grasping of such easier for the operator.

The refrigeration unit 20 may include an interior chamber 57. The interior chamber 57 may be of any appropriate configuration. The interior chamber 57 may store the contents dispensed through the content dispenser 32. The interior chamber 57 may include shelving to help store such contents as further described below. The interior chamber 57 may be generally circumscribed by the housing 50. The interior chamber 57 may be made of a generally insulative material, which in addition to the chiller 49 may keep the contents at a predetermined temperature.

Further, the refrigeration unit 20 may include a plurality of wheeled casters 56. The wheeled casters 56 may be attached to the housing 50 in any appropriate manner. The wheeled casters 56 may allow the refrigeration unit 20 and more particularly the modular blending system 10 to be selectively positionable. Using the wheeled casters 56, the modular blending system 10 may be rolled to an appropriate operative position. For example, the modular blending system 10 may be positioned in close proximity to a water source, a power source or a drain as needed. Once in the appropriate position, at least a pair of the wheeled casters 56 may be locked such that the modular blending system 10 is stationary; although all of the wheeled casters 56 may be locked. This may prevent unwanted movement of the modular blending system 10.

Alternatively, the modular blending system 10 may include a storage system (not shown) alternatively or in addition to the refrigeration unit 20. In such modular blending systems, the contents added to the ice shavings may not needed to be refrigerated. Therefore, the refrigeration unit 20 may not be needed. The storage system may be of a similar construction to that of the refrigeration unit 20. By way of a non-limiting example, the storage system may include any one of an interior chamber, housing with a door, and wheeled casters. Further still, the storage system may be a pre-existing work space that may possess the appropriate configuration. In such embodiments, the remaining components of the modular blending system may be placed on such work space. In yet other embodiments, the modular blending system may utilize both the refrigeration unit 20 and the storage system. The present teachings are not limited to a specific configuration.

The ice shaver 24 may be operatively and selectively attached with the refrigeration unit 20 in any appropriate manner, for example, the ice shaver 24 may be positioned on a top portion 59 of the refrigeration unit 20. The refrigeration unit 20 may include an ice maker (not shown), an ice maker may be operatively attached with the ice shaver 24 such that ice is dispensed into the ice shaver 24 as needed, or the modular blending system 10 may be positioned in proximity to an ice maker. The ice maker, whether separate or part of the refrigeration unit 20, may create ice that may be manually or automatically transported to the ice shaver 24 in any appropriate manner. Alternatively, ice may be obtained from a separate ice maker and either manually or automatically transported to the ice shaver 24. Once the ice shaver 24 includes ice, it may weigh out an appropriate amount of ice and expel such.

Further, the ice shaver 24 may include an ice container 60. The ice container 60 may be of any appropriate shape and size and may be made from any appropriate material; for example, plastic, metal or the like. The ice container 60 may be of a general bowl shape such that it may operatively hold ice added thereto. The ice shaver 24 may further include a selectively removable container lid 62 that may be selectively and operably coupled with the ice container 60 in any manner. The container lid 62 may be made of any appropriate material; for example, plastic, metal or the like. The container lid 62 may be selectively removed from the ice shaver 24 to add ice to the ice shaver 24. The container lid 62 may then be operatively coupled to the ice container 60 to operate the ice shaver 24.

Either of the container lid 62 and container 60 or both may include a sensor (not shown) or sensors. The sensors may be capable of detecting operative coupling of the container lid 62 with the container 60. Upon detection of such operative coupling, the ice shaver 24 may be operated to shave the ice within the container 60. Otherwise, if the sensors do not detect such operative condition, the ice shaver 24 may not be operable. This may generally prevent ice from inadvertently being dispensed from the top of the container 60.

The ice shaver 24 may further include an ice shaving mechanism 64. The ice shaving mechanism 64 may be any appropriate device; the present teachings are not limited to a specific configuration. The ice shaving mechanism 64 may be operably coupled with the container 60 so as to appropriately shave the ice held therein. The ice held within the container 60 may be transported through any appropriate mechanism to the ice shaving mechanism 64 and may then be shaved in any appropriate manner.

The ice shaver 24 may include an ice shoot 66 that may be operably coupled with the ice shaving mechanism 64. The ice shoot 66 may expel the shaved ice from the ice shaver 24 in any appropriate manner. The present teachings are not limited to a specific configuration. The ice shaving mechanism 64 may be programmed to shave the ice in any predetermined manner, i.e., the ice shaving mechanism 64 may be programmed to produce a predetermined shape and size of ice. This may provide additional flexibility for the operator to determine what kind of product the modular blending system 10 is to produce.

The ice shaver 24 may include a housing 68. The housing 68 may generally circumscribe the ice shaving mechanism 64 generally obstructing such from view. The housing 68 may generally hold the container 60 within an operative position and may have attached thereto the ice shoot 66. The housing 68 may further include a refrigeration attachment mechanism 70 of any appropriate configuration. The refrigeration attachment mechanism 70 may selectively secure the ice shaver 24 with the refrigeration unit 20. The refrigeration attachment mechanism 70 may selectively position the ice shaver 24 in an operative position on the top portion 59 refrigeration unit 20. The refrigeration attachment mechanism 70 may also permit the ice shaver 24 to be selectively attached with the refrigeration unit 20 in a plurality of operative positions.

The refrigeration unit 20 may include mating shaped and sized ice shaver attachment mechanism 72 that may selectively engage with the refrigeration attachment mechanism 70. This may selectively secure the ice shaver 24 with the refrigeration unit 20. The attachment mechanisms 70, 72 may also be configured such that the ice shaver 24 may be selectively removed from the refrigeration unit 20—resulting in the ice shaver 24 being modular with respect to the refrigeration unit 20. This modularity permits the ice shaver 24 to be removed from the modular blending system 10 so as to clean, repair or even replace the ice shaver 24. Removing the ice shaver 24 may make it easier to clean as more components may be accessed and cleaned. The modularity also allows a new ice shaver 24 to be added without having to replace the entire modular blending system 10. Further, the operative engagement of the ice shaver attachment mechanism 72 and the refrigeration attachment mechanism 70 may be of a configuration to permit easy removal of the ice shaver 24 from the refrigeration unit 20. It may also be of a configuration such that selective attachment of the ice shaver 24 with the refrigeration unit 20 is easy for an operator to accomplish. Moreover, the ice shaver 24 remains fully operable when detached from the refrigeration unit 20.

The ice shaver 24 may include a water dispenser 77. The water dispenser 77 may be positioned in any appropriate position on the ice shaver 24. By way of a non-limiting example, the water dispenser 77 may extend outward from the housing immediately or in proximity to the ice shoot 66. As shown in FIG. 2, 4-8, the water dispenser 77 may be positioned immediately below the ice shoot 66 and immediately above the container 36. This position of the water dispenser 77 may permit the operator to dispense water into the container 36 as may be necessary to create a product, such as a drink. For example, certain drinks require a predetermined amount of water to be added instead of just ice. The operator may be able to dispense a predetermined amount of water from the water dispenser 77 into the container 36 along with a predetermined amount of ice from the ice shoot 66. With the water dispenser 77 in close proximity to the ice shoot 66, the operator may be able to accomplish adding the water and ice generally simultaneously, immediately after one another, or otherwise in a predetermined manner. The water dispenser 77 may be operatively engaged with a water source (not shown), which may be the same as the water source for the cleaning unit (described below) or a different water source. Further, the water source may be the same or different from the water source to generate ice. The water dispenser 77 may include a water filtration system to help ensure that the water dispensed therefrom is of appropriate quality. The water dispenser 77 may also be operatively engaged with a water source that is already filtered. The present teachings are not limited to the configurations described herein; any appropriate configuration of water dispenser 77 may be utilized without departing from the present teachings. For example, the water dispenser 77 may be a component separate from the ice dispenser.

The blender 28 may be any appropriate type of blender and may be of any configuration. The present teachings are not limited to a specific configuration of the blender 28. By way of a non-limiting example, the blender 28 may be THE QUIET ONE blender from Vita-Mix Corporation. The blender 28 may be selectively attached to the refrigeration unit 20 in any appropriate manner, such as on the top portion 59 thereof. By way of a non-limiting example, the refrigeration unit 20 may include a blender attachment mechanism 80 attached to the top portion 59 thereof. The blender 28 may be selectively attached with the attachment mechanism 80 in any appropriate manner. Additionally, the blender 28 may be selectively removable from the attachment mechanism 80 resulting in the blender 28 being removable from the refrigeration unit 20. The blender 28 remains fully operable when detached from the refrigeration unit 20. This may make the blender 28 modular with respect to the refrigeration unit 20.

Further, the attachment mechanism 80 may be positioned on the refrigeration unit 20 generally positioning the blender 28 in an appropriate operative position. By way of a non-limiting example, the blender 28 may be positioned adjacent the dispenser 32 and in close proximity to the ice shaver 24. Alternatively, the blender 28 may be positioned adjacent the ice shaver 24 and in close proximity to the dispenser 32. The present teachings are not limited to a specific location—any appropriate location may be used without departing from the present teachings. The blender 28 may include a sound box 82. The sound box 82 may be of any appropriate configuration. The sound box 82 may generally dampen sounds that may be produced during operation of the blender 28.

The dispenser 32 may be operatively and selectively attached with the refrigeration unit 20 in any appropriate manner. The dispenser 32 may dispense contents, such as flavoring or the like, that may be stored within the refrigeration unit 20 in any appropriate manner. The dispenser 32 may include a housing 90. The housing 90 may be made of any appropriate material and may generally circumscribe a nozzle 92 from which the contents may be dispensed. The nozzle 92 may include a plurality of ports that may expel a predetermined content from the refrigeration unit 20. The operator may initiate use of the dispenser 32 through use of the graphical user interface 48. Upon such initiation, a metered dose of the flavoring may be dispensed from the dispenser 32 in any appropriate manner.

As shown in FIGS. 1-8, the dispenser 32 is separate from the ice shaver 24. During operation, ice may be expelled from the ice shaver 24, or more specifically, the ice shoot 66 and then—or before, as applicable—contents may be expelled separately from the dispenser 32, or more specifically, the nozzle 92. Still further, water may be dispensed from the water dispenser 77. Alternatively, the ice, contents, and/or water can all be dispensed simultaneously to reduce the time it takes to prepare a beverage. The dispenser 32 being separate and independent of the ice shaver 24 may make the modular blending system 10 easier to clean. By way of a non-limiting example, the dispenser 32, ice shaver 24, and water dispenser 77 may all be cleaned apart from one another. Accordingly, the components may be cleaned upon different intervals, different processes may be used to clean each, and different solutions may be used to clean each. Further still, the components being independent may allow for replacement of one without having to replace the other. This may allow operation of the modular blending system 10 even while one component may be undergoing cleaning or replacement. For instance, if the ice shaver 24 is undergoing cleaning or replacement, drinks can still be made with the modular blending system 10, either without ice or with ice added manually. The dispenser 32 being independent of the ice shaver 24 may generally prevent unwanted mixing of the contents dispensed through the dispenser 32 with ice from the ice shaver 24. This may result in a better quality end product. Further, the dispenser 32 being independent of the water dispenser 77 may generally prevent unwanted mixing of the contents dispensed through the dispenser 32 with water from the water dispenser 77.

The dispenser 32 may be attached with the support 40. The support 40 may include a dispenser attachment mechanism 94 such that the housing 90 of the dispenser 32 may be attached thereto. The housing 90 may be attached in any appropriate manner, such as through the use of fasteners 96. The fasteners 96 may permit the housing 90 to be selectively securable to the support 40. This may permit the dispenser 32 to be removed from the modular blending system 10 so as to clean such, resulting in the dispenser 32 being modular.

The container 36 may be of any appropriate configuration and made of any material. By way of a non-limiting example, the container 36 may be the ADVANCE container from Vita-Mix Corporation. The container 36 may selectively engage with the support 40 resulting in the container 36 being modular with the modular blending system 10. As the support 40 may be attached with the refrigeration unit 20, the container 36 may be selectively attached with the refrigeration unit 20.

The container 36 may be positioned in an operative position with respect to the ice shaver 24 or dispenser 32, or both the ice shaver 24 and dispenser 32. By way of a non-limiting example, the container 36 may be operatively positioned such that ice may be expelled from the ice shaver 24—or more specifically, the ice shoot 66 and into the container 36. Further, the container 36 may be operatively positioned relative to the dispenser 32 such that contents, such as flavoring, may be expelled from the dispenser 32 into the container 36. The container 36 may be positioned such that water may be dispensed from the water dispenser 77 into the container 36 as is necessary. The container 36 may be positioned such that it need not be moved to have the ice, water and contents expelled therein.

Further, the container 36 may be of a shape and size that it is also operatively positioned on the blender 28. This may permit the contents, water and ice expelled into the container 36 (as is necessary) to further undergo a blending operation as desired. The operator may manually lift the container 36 from the support 40 and insert it into or onto as applicable, the blender 28. The blender 28 may then be used to blend the contents within the container 36.

The container 36 may include a handle 102 that may make it easier for the operator to position the container 36 as required. The container 36 may also include a spout 104 of any appropriate shape. The spout 104 may be positioned generally opposite the handle 102. The spout 104 may be shaped and sized to assist expelling contents of the container 36 into an appropriate vessel, typically for consumption by a customer.

The container cleaner 44 may be operatively and selectively attached with the support 40. The container cleaner 44 may be of any appropriate configuration. By way of a non-limiting example, the container cleaner 44 may include a generally high-pressure nozzle 110 that may expel water at a rate to generally clean the container 36. The container cleaner 44 may further include tubing 112 operatively coupled with the high-pressure nozzle 110 that may supply the appropriate amount of water from a water source. In addition, a sanitizing solution, soap, detergent, or similar cleaning agents may be coupled with the tubing 112 or may otherwise be a separate source such that sanitizer, soap, or detergent may be mixed with the water from the high-pressure nozzle 110.

The container cleaner 44 may further include a liquid vessel 114 that may generally hold the water expelled from the high-pressure nozzle 110. The liquid vessel 114 may be of any appropriate shape and size such that the container 36 may generally fit therein. Additionally, the liquid vessel 114 may be of a shape and size such that any other mechanism or device from the modular blending system 10 or used in association therewith may be inserted therein and cleaned. The container cleaner 44 may further include a drain mechanism 116 that may drain away the waste water or combined waste water and cleaning agent after use of the container cleaner 44. Tubing 118 may be operatively coupled with the drain 118 to transport such waste water or combined waste water and cleaning agent to an appropriate drainage mechanism.

The graphical user interface 48 may be attached to the modular blending system 10 at any appropriate location. By way of a non-limiting example, the graphical user interface 48 may be attached to the ice shaver 24 such as shown in FIGS. 1-8, or may be selectively attached thereto such that the graphical user interface 48 may be removed from the modular blending system 10. In such embodiment, the graphical user interface 48 may be wirelessly coupled with the central processing unit coupled with the modular blending system 10 or may include the central processing unit and be wirelessly coupled with the modular blending system 10. Any configuration may be utilized. The graphical user interface 48 may be of any appropriate configuration, including, without limitation being a touch screen 120 operated graphical user interface. Specifically, the graphical user interface 48 may be operatively coupled with at least any one of the refrigeration unit 20, ice shaver 24, blender 28, dispenser 32, water dispenser 77, and container cleaner 44, including, without limitation, all of the refrigeration unit 20, ice shaver 24, blender 28, dispenser 32, water dispenser 77 and container cleaner 44. The graphical user interface 48 may functionally operate any of the foregoing.

Alternatively, the graphical user interface 48 may be separate from the modular blending system 10. In these embodiments, the graphical user interface 48 may be wirelessly coupled with the modular blending system 10. As with hard-wired embodiments, the wireless embodiments may be operatively coupled with at least any one of the refrigeration unit 20, ice shaver 24, blender 28, dispenser 32, water dispenser 77, and container cleaner 44. The wireless graphical user interface 48 may be a mobile device, such as a smart phone, tablet, laptop computer, or any other such device with an application that functions as the graphical user interface otherwise described herein.

The graphical user interface 48, regardless of being hard-wired or wireless, may be operatively coupled with a central processing unit (not shown) operatively coupled with at least any one of the refrigeration unit 20, ice shaver 24, blender 28, dispenser 32, water dispenser 77, and container cleaner 44. The central process unit may be positioned within the graphical user interface 48 or may be exterior of such. The graphical user interface 48 may be hard-wired or wirelessly coupled with the central processing unit.

The touch screen 120 of the graphical user interface 48 may operate the applicable functionality of the modular blending system 10. The operator may operate the modular blending system 10 through operation of the graphical user interface 48. The operator may select an applicable function on the graphical user interface 48 and the applicable system will function accordingly. By way of a non-limiting example, the operator may select an amount of ice to be shaved by the ice shaver 24. The operator may then elect what flavoring is dispensed from the dispenser 32 into the container 36 and the amount so dispensed. For example, the graphical user interface 48 may control which of the plurality of flavorings stored within the refrigeration unit 20 or stored outside thereof may be dispensed through the dispenser 32 and the amounts dispensed. The graphical user interface 48 may also control functions such as the operating conditions of the refrigeration unit 20—for example, the temperature of the refrigeration unit 20. The graphical user interface 48 may also control the blending of the blender 28, time, cycles, etc. and may control a cleaning operation of the container cleaner 44. Further still, the graphical user interface 48 may be programmed such that the operator may merely select the product desired and the graphical user interface 48 through the central processing unit will dispense the appropriate amounts of ice, flavoring, or water into the container 36. Further, the blender 28 may function as pre-programmed to create the applicable product selected by the operator.

The graphical user interface 48 may be programmable in any appropriate manner and to any extent. The graphical user interface 48 may be customizable as well as the modular blending system 10. By way of a non-limiting example, the appearance of the graphical user interface 48 may be programmed to have a certain look and feel, such as a specific color, color pattern, font, size, graphical appearance, logos, etc. The graphical user interface 48 may include predetermined recipes for products—such recipes may be merely the operator's reference, may be used to automate the modular blending system 10 or a combination of both. The graphical user interface 48 may further include instructions, such as an instruction manual for the modular blending system 10. The instructions may be of any appropriate format, including, being a pictorial representation of the steps necessary to accomplish a task, e.g., creating products, cleaning the modular blending system 10, maintenance of the modular blending system 10 and the like.

The graphical user interface 48 may be utilized to service and maintain the modular blending system 10. The graphical user interface 48 may be programmed to instruct the timing, application and parameters for the cleaning mode. By way of a non-limiting example, the graphical user interface 48 may identify when the modular blending system 10 or any component thereof is to be cleaned. Further, the graphical user interface 48 may render inoperative any component of the modular blending system 10 until it is cleaned or serviced as applicable—such as a weekly cleaning. The graphical user interface 48 may also include a service screen for a technician to service the modular blending system 10 or any component thereof. The graphical user interface 48 may indicate service issues, provide instructions for repair, or provide other instructions to maintain any of the components.

The modular blending system 10 may store and dispense a plurality of contents, such as flavorings, stored in a predetermined location through the dispenser 32 into the container 36. The flavorings are typically a liquid or puréed solid that may be stored within a receptacle (not shown). The flavorings may need to be kept generally cool—requiring that the receptacles be stored within the refrigeration unit 20. The refrigeration unit 20 may therefore include at least one tray 130, or a plurality of trays 130, that may be selectively positioned within the refrigeration unit 20.

The trays 130 may be of any appropriate shape and size and are not limited to the configurations shown herein. The trays 130 may generally hold the flavoring receptacle in an operative position relative to the dispenser 32 within the refrigeration unit 20. The size and shape of the trays 130 may be customizable such that they may be selectively adjusted to the appropriate shape and size to hold different sized receptacles. By way of a non-limiting example, receptacles of different flavorings may be of different shapes and sizes depending upon several factors, such as, the popularity of the flavoring, content of the flavoring, form of the flavoring (i.e., a liquid or puréed solid), and the like. The trays 130 may be customized to account for the sizes of the receptacles. The width, height, or depth of the trays 130 may be adjustable in any appropriate manner to accommodate the specific size of the receptacle operatively positioned therein. Further, the trays 130 may be adjustable to accommodate for the shape, size and configuration of the refrigeration unit 20 in which it is inserted.

The trays 130 or a single tray 130 may be operatively positioned within the refrigeration unit 20 in any appropriate manner. The tray 130 may be positioned on a floor 131 of the refrigeration unit 20. The tray 130 may be shaped and sized such that it generally encompasses the entire floor 131. Further, the tray 130 may be shaped and sized to generally fill the entire interior chamber 57 or a portion thereof. Alternatively, a plurality of trays 130 may be of shapes and sizes such that they fit on the entire floor 131. Further still, the trays 130 may be of a configuration such that a plurality thereof may be stacked on top of one another within the refrigeration unit 20. Any appropriate number of trays 130 may be stacked from the floor 131 and may fill any appropriate portion of the interior chamber 57. In this configuration, the trays 130 may be of a shape and size such that they operatively position the receptacles with respect to the dispenser 32.

The trays 130 may also be operatively secured within the refrigeration unit 20 utilizing a tray positioning device, such as the shelving unit 132 shown in FIGS. 3-8. The trays 130 may be attached to the shelving unit 132 positioned within the refrigeration unit 20 in any appropriate manner. The trays 130 may be selectively attached to the shelving unit 132 to generally hold the trays 130 in an operative position relative to the receptacle. This may also permit the receptacle to be located in an operative position relative to the dispenser 32 such that the receptacle is drainable in an efficient and effective manner through the dispenser 32. The operator may insert the receptacle into the applicable tray 130 and the receptacle will be in the appropriate position to be operatively connected with the dispenser 32 to permit efficient draining of the receptacle. The trays 130 may be removable from the shelving unit 132 such that the applicable receptacle may be added to the tray 130 and then reinserted into the shelving unit 132 and refrigeration unit 20.

The shelving unit 132 may be of any appropriate configuration and is not limited to that shown. By way of a non-limiting example, the shelving unit 132 may span generally the entire interior chamber 57, sit on the floor 131, selectively or fixedly attach to side walls of the refrigeration unit 20, suspend from a top of the refrigeration unit 20, or any combination of the same. The shelving unit 132 may include a floor on each shelf such that the tray 130 may be positioned thereon. Alternatively, the shelving unit 132 may not include a floor on each shelf, but may be configured such that the tray 130 may suspend from a portion of the shelving unit 132. This may accommodate for trays 130 of different depths. Further still, at least any one of the following of the shelving unit 132 may be customizable: the distance between the shelves, the width of the applicable shelves, the number of shelves utilized vertically or horizontally, or any combination of such.

Further, a pumping unit 134 with a metering device may be operatively attached with the trays 130, or more specifically the receptacle. The pumping unit 134 may be operatively connected with the dispenser 32 to expel the flavorings as required. The operator may select the amount and type of the flavoring to be added to the shaved ice on the graphical user interface 48. The central processing unit may initiate operation of the appropriate pumping unit or pumping units 134—any appropriate number of pumping units may be utilized (2, 3, 4, 5, 6, or each tray 130 may have a pumping unit)—to withdraw the appropriate flavoring from the appropriate tray 132 up through the dispenser 32. To assist with the movement of the flavoring, a plurality of tubes may be operatively positioned between the pumping units 134 and the dispenser 32, i.e., each flavoring may have a tube operatively coupled therewith, i.e., a continuous tube may be utilized between the dispenser 32 and the pumping unit 132. A holder (not shown) may be utilized to organize such tubing in operative positions within the refrigeration unit 20. This may provide an organized, easy to use modular blending system 10.

The pumping unit 134 may be configured to provide dynamic braking and reversing of the flow of fluid from the applicable dispensing manifold to the fluid dispenser 32. This dynamic braking and reversing may generally prevent leakage from the tubes, dispenser, fluid dispenser, and the like. This may also allow for a more accurate dispensing of fluid from the dispenser to and through the fluid dispenser 32, which may increase the quality of the product so produced. The pumping unit 134 may be of any appropriate configuration. By way of a non-limiting example, the pumping unit 134 may include a peristaltic pump, which can move liquid within the tubes in operative communication therewith. Any appropriately sized and powered peristaltic pump may be used without departing from the present teachings.

The graphical user interface 48 through the central processing unit may be utilized the location of a receptacle within the shelving unit 132 or a particular tray 130. The graphical user interface 48 may identify the product held in a predetermined receptacle, in a predetermined shelving unit 132, in a particular tray 130 or any combination of such. By way of a non-limiting example, the graphical user interface 48 may identify that a predetermined shelving unit 132—bottom left—may contain a tray 130 that includes a receptacle having coffee that is one-half full or contains 51 ounces of coffee. The graphical user interface 48 may be programmed with this information manually or through use of a bar code scanner or the like. The graphical user interface 48 may identify when a particular receptacle needs to be replaced, i.e., it may record the inventory level of product held therein. This may be accomplished by entering or otherwise identifying (such as by weighing) the weight of the receptacle being operatively attached to the modular blending system 10. The modular blending system 10 may meter out the product held in that particular receptacle, such as through use of pumping units 134, and may total the amount so dispensed. This may allow the modular blending system 10 to notify the operator in advance of a particular receptacle becoming empty so that it may be reordered in advance and may identify the specific inventory level of a particular product identified by the operator. The graphical user interface 48 may alert the operator to this condition such that the operator may manually order replacement product. In addition or alternatively, the modular blending system 10 may interact with a separate computing system, or utilize its central processing unit to automatically reorder product in advance of it becoming empty.

Further, the tubes operatively coupled with the flavoring, pumping units 134 and dispenser 32 may include a protective layer to generally prevent against premature wear to the tubes during operation of the modular blending system 10. The protective layer may be of any appropriate configuration that may provide a surface generally resistant of wear. By way of a non-limiting example, the protective layer may include a sock that generally circumscribes the tube. The sock may extend any appropriate length of the tube, such as that portion that undergoes wear during operation of the modular blending system 10. The sock may be made of any appropriate material, including, without limitation, Kevlar, Mylar or any similar protective material.

The modularity of the modular blending system 10 may allow replacement of any one of the various components, may allow for different configurations thereof, and may be easier to clean. For example, any one of the refrigeration unit 20, ice shaver 24, blender 28, content dispenser 32, container 36, water dispenser 77, support 40, container cleaner 44, and graphical user interface 48 is inoperative may be replaced without having to replace any of the other components. Additionally, the operator may create a modular blending system 10 that may include only some of the components. For example, if blending of the shaved ice with flavoring is not necessary, the modular blending system 10 may not include the blender 28. If at a future point, the blender 28 is needed, it may be added thereto. The operator may select which components to attach. This may even allow the operator to retro-fit the modular blending system 10 with already existing components. The operator need not purchase new components. The modular blending system 10 may be built piece by piece as opposed to all at once.

The modularity of the modular blending system 10 also allows each of the components to operate independently of one another. Each of the components, i.e., the refrigeration unit 20, ice shaver 24, blender 28, content dispenser 32, the water dispenser 77, container 36, support 40, and container cleaner 44 may be operated through the graphical user interface 48 or through a control mechanism on each such component. For example, the refrigeration unit 20 may function independent of the other components. The refrigeration unit 20 may operate at a first predetermined temperature and the dispenser 32 may include a cooling mechanism that may operate at a second predetermined temperature. The first and second temperatures may be different, or alternatively may be generally the same. Further, preselected of the components may be made operational while the remaining components may be made inoperative.

Further still, the modular blending system 10 may position the discrete components thereof in a manner that permits efficient operation of the modular blending system 10. The refrigeration unit 20, ice shaver 24, blender 28, content dispenser 32, water dispenser 77, support 40 and container 36 may be positioned such that the intersection of these modular components may dispense the applicable product into a single area. This allows for efficient operation of the modular blending system 10 by a single operator. For example, the operator may place the container 36 onto the support 40. The operator may then dispense ice from the ice shaver 24 through the ice shoot 66 and water through the water dispenser 77. The shaved ice or water may be dispensed within the container 36. The operator may then active the dispenser 32 and the applicable flavoring may be dispensed from the receptacle within the refrigeration unit 20 into the container 36 without movement of the container 36. With the blender 28 being in close proximity, the operator may lift the container 36 and operatively connect such with the blender 28. The operator may operate the blender 28 as appropriate. Upon completion of such blending, the operator may dispense the contents into a vessel for consumption by a customer.

The position of the container cleaner 44 may be such that the operator after dispensing the contents from the container 36 for the customer, may operatively position the container 36 relative to the container cleaner 44. The container cleaner 44 may dispense water through the nozzle 110 cleaning the container 36 such that the above process may be repeated. The graphical user interface 48 may also be in a position where a single operator may efficiently manipulate the graphical user interface 48 without having to move. The location of the modular components of the modular blending system 10 may permit a single operator to efficiently operate such to create the appropriate consumable and clean the container in anticipation of repeating the process for additional customers.

To clean the modular blending system 10, the operator may only need shut down one of the components and clean it. The remaining components may remain operational. This may allow for certain uses of the modular blending system 10 despite certain of the components being cleaned. For example, if the blender 28 is being cleaned, the ice shaver 24, refrigeration unit 20, and dispenser 32 may continue to operate and prepare the appropriate iced items.

Additional embodiments of a modular blending system according to the present teachings are described below. In the descriptions, all of the details and components may not be fully described or shown. Rather, the features or components are described and, in some instances, differences with the above-described embodiments may be pointed out. Moreover, it should be appreciated that these additional embodiments may include elements or components utilized in the above-described embodiments although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired modular blending system without departing from the spirit and scope of the present teachings.

A modular blending system 200 may include a refrigeration unit 220, an ice shaver 224, a blender 228, and a content dispenser 232. The modular blending system 200 may also include a container 236, a support 240, a container cleaner 244, and a graphical user interface 248. At least one of the aforementioned components may be modular with respect to the modular blending system 200. Alternatively, all of the components may be modular with respect to the modular blending system 200, i.e., they may be selectively attachable to and removable from the modular blending system 200. The modular blending system 200 may further include a cleaning system 250. The cleaning system 250 may be selectively engaged with the modular blending system 200. Upon such engagement, the graphical user interface 248 may indicate available cleaning options to the operator. The operator may select the appropriate cleaning operation and the cleaning system 250 may operate in accordance with such.

To utilize the cleaning system 250 the operator may first pull product bags, i.e., the flavoring, from the refrigeration unit 220. The operator may then clean all of the applicable connectors and may attach the cleaning system 250. The cleaning system 250 may include a sanitizing connector 252 with tubing that may easily and selectively attach to the appropriate components of the modular blending system 200. Once the cleaning system 250 is connected, the operator may then put the container 236 under the dispenser 232 and place the tubing 254 of the cleaning system 250 into any appropriate cleaner/sanitizer.

The operator may then use the graphical user interface 248 to begin operation of the pumping units or in the alternative may directly operate the pumping units. Operating the pumping units may begin emptying the flavoring from the modular blending system 200 and inserting the cleaner/sanitizer therein. Specifically, the flavoring may be removed from and cleaner/sanitizer inserted into the tubing 254. After a predetermined amount of soaking time, the pumping units may be operated in any appropriate manner to insert fresh cleaner/sanitizer into the tubing 254 while also removing the older cleaner/sanitizer.

After a predetermined amount of soaking time, the pumping units may be operated, this time in a reverse direction to expel the cleaner/sanitizer from the tubing 254 and pumping units. In addition to reversing the flow in the system to remove the product remnants and cleaner/sanitizer, the modular blending system 200 and cleaning system 250 may utilize gravity to assist with removing the product remnants and cleaner/sanitizer. The operative position of the cleaning system 250 with respect to the modular blending system 200 may permit gravity to assist with evacuating the tubing of the modular blending system 200. This may fully expel the cleaner/sanitizer and any flavoring remnants from the modular blending system 200.

The operator may also utilize the cleaning system 250 to create a washing machine effect within the modular blending system 200. After the afore-mentioned soaking, the operator may reverse the direction of the pumping units. However, instead of expelling the cleaner/sanitizer from the tubing 254, the operator may operate the pumping unit in a forward direction preventing the cleaner/sanitizer from being expelled from the modular blending system 200. The operator may repeat this reverse-forward operation of the pumping unit a predetermined number of times. Causing the pumping unit to go from reverse to forward and back causes the cleaner/sanitizer to move forward and backward within the tubing 254 of the modular blending system 200. This movement of the cleaner/sanitizer within the tubing 254 creates the washing machine effect and may further clean the modular blending system 200 resulting in a superior cleaning. This back and forth effect may cause more debris and other items that may have otherwise been stuck to the tube to become unstuck and expelled from the modular blending system 200. Once the appropriate number of cycles has been completed, the pumping units may be operated in a reverse direction expelling the cleaner/sanitizer from the tubing 254 and pumping units.

The operator may then remove the cleaning system 250; specifically, the tubing 254 and sanitize connector 252. The flavoring may be added back to the modular blending system 200 as applicable and the pumping units may be used to prime such flavoring. The modular blending system 200 may now be in an operative condition. Using gravity as indicated above to further assist with evacuating the modular blending system 200 may result in the first product created from the newly cleaned modular blending system 200 being free of any flavoring remnants and cleaner/sanitizer. Other prior art blending systems may waste the first product due to containing cleaner/sanitizer after cleaning.

Further, the modular blending system 10 or 200 may include a tray 330 configured to adjust the positioning of a flavoring receptacle 323 placed therein as content is removed from the receptacle 323. By way of a non-limiting example, the tray 330 may include a base plate 310. The base plate 310 may be movable with respect to a bottom portion 312 of the tray 330, such as pivotable with respect thereto. The tray 330 may further include an opening 320 to receive a receptacle spout 327. As the base plate 310 pivots, the angle of the receptacle 323 may change to assist in evacuating substantially all of the liquid from the receptacle 323 through the opening 320.

The base plate 310 may be movable between at least first and second positions. The first position may be generally parallel to the bottom portion 312 and the second position may be at an angle of approximately between 0-90 degrees from parallel with the bottom portion 312. In an embodiment, the second position may be approximately 25 degrees from parallel with the bottom portion 312.

The base plate 310 may be biased toward the second position. For example, the tray 330 may include a biasing member 314, such as a spring, elastic band, or any appropriate biasing mechanism—the present teachings are not limited to the configurations shown and described herein. The biasing member 314 may be configured bias the base plate 310 to a predetermined angle and configured to allow the base plate 310 move toward the first position in response to a weight applied to the base plate 310.

In embodiments shown, the biasing member 314 may comprise an elastic band 316. The elastic band 316 may be connected on a first end to a side of the tray 330 and on a second end to the base plate 310. The elastic band 316 may extend when a liquid receptacle 323 is placed in the tray 330 to allow the base plate 310 to move to the first position, generally parallel with the bottom portion 312 of the tray 330. As liquid is removed from the receptacle 323 and the weight of the receptacle 323 is reduced, the elastic band 316 may contract to move the base plate 310 toward the angled second position and assist with evacuating liquid from the receptacle 323. It will be appreciated that the tray 330 may include more than one biasing member 314, such as an elastic band 316 positioned on each side of the tray 330.

Figure 20:
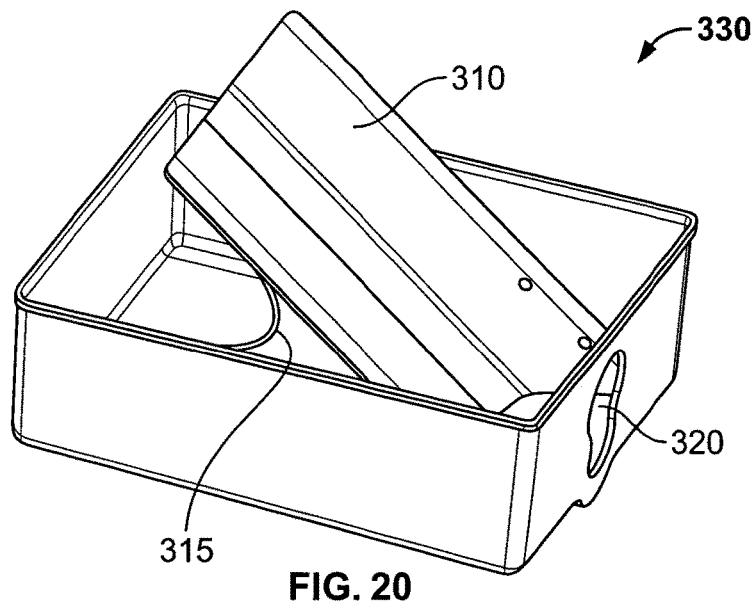
FIG. 20 is a perspective view of a tray and base plate having a leaf spring.
Figure 21:
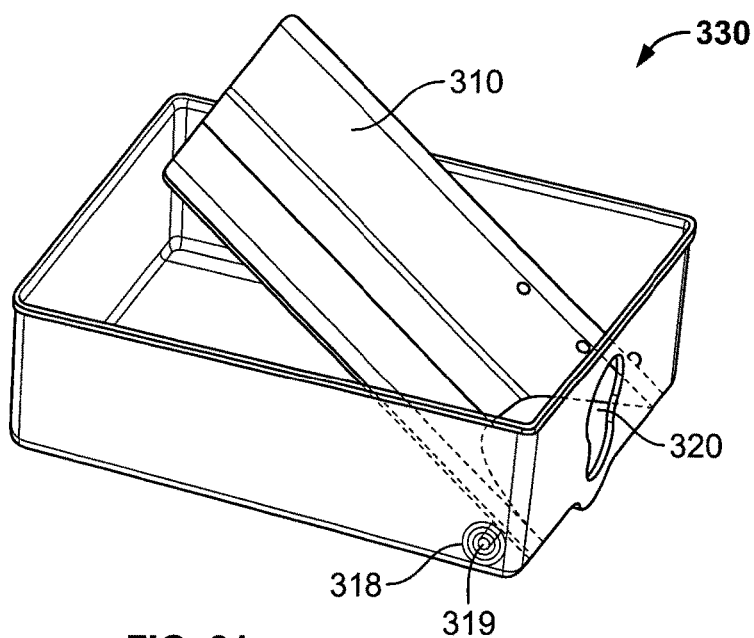
FIG. 21 is a perspective view of a tray and base plate having a torsion spring.
Figure 22:
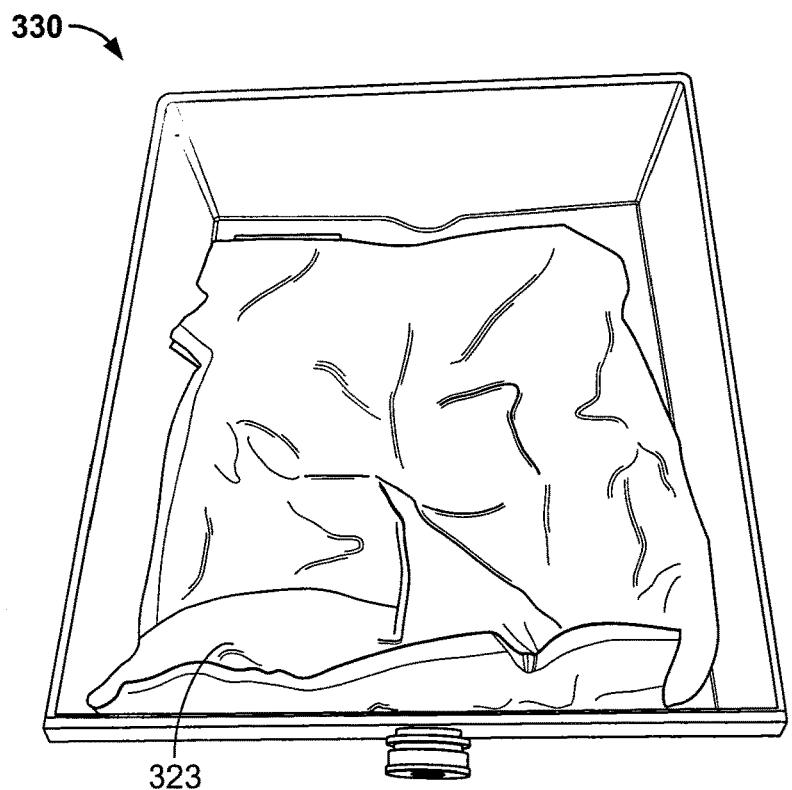
FIG. 22 is a non-emptied receptacle in a horizontal position in a tray.
Figure 23:
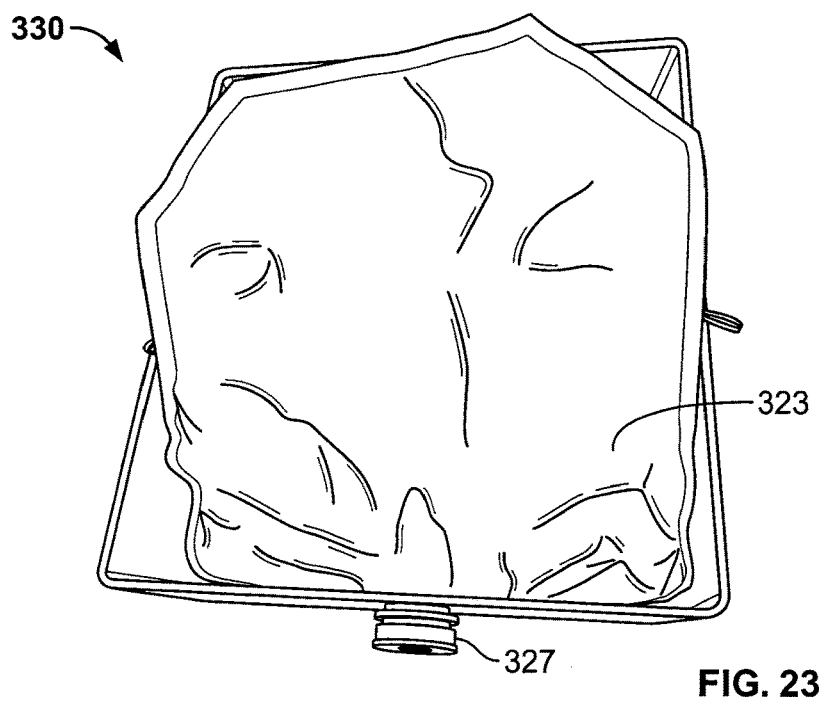
FIG. 23 is an emptied receptacle in a lifted position in a tray.
Figure 24:
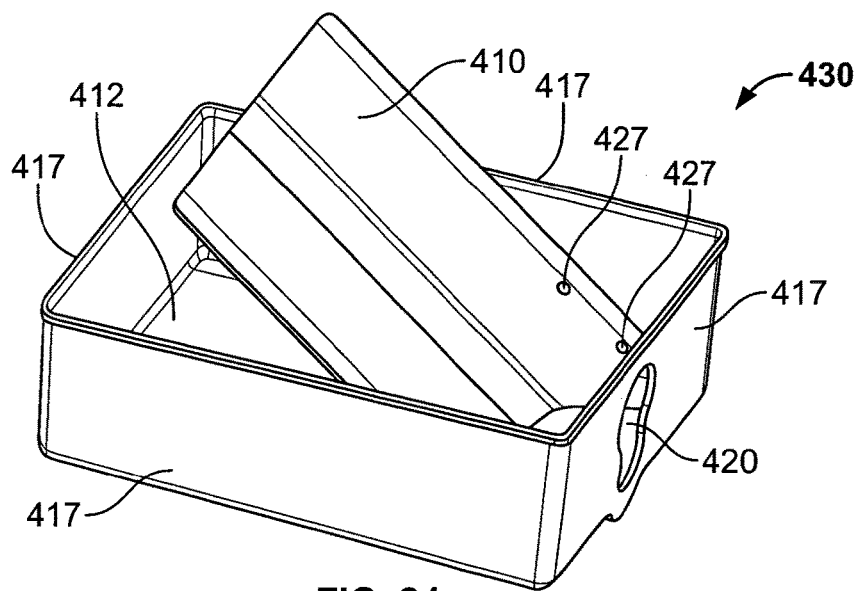
FIG. 24 is a perspective view of a tray for a storage unit of a modular blending system.

In an embodiment, the biasing member may be a leaf spring 315, as shown in FIG. 20. The leaf spring 315 may be positioned between the bottom portion 312 and the base plate 310 to bias the base plate 312 to the lifted position.

In an embodiment, the biasing member 314 may be a torsion spring 318. The torsion spring 318 may be positioned near a side or corner of the base plate 310. The torsion spring 318 may be connected to a rod 319 that is connected to the base plate 310. The torsion spring 318 may rotate the rod 319 to move or pivot the base plate 310 between the first position and lifted second position.

The force applied by the biasing mechanism 314 may be adjustable to offset a predetermined weight. For example, the length of the elastic band 316 may be adjusted to tighten or loosen the band, thereby increasing or decreasing the force applied by the biasing member 314. The biasing force may be tuned to a specific application to set a predetermined weight at which the base plate 310 will be raised toward the second position.

In an embodiment, the tray or trays 330 within the storage unit 20 or 220 may be positioned at an angle. For example, the trays 330 may be positioned at an angle greater than parallel to a base of the interior chamber 57 of the storage unit 20 or 220, such as 25 degrees with respect to the base of the interior chamber 57. The angled trays 330 may be used in conjunction with a biasing member 314 as described above, or may alleviate the need for the biasing device 314.

In use, the tray 330 may be positioned within the storage unit 20 or 220 and the biasing member 314 may be tuned to a desired force. A flavoring receptacle 323 may be placed within the tray 330 and may move the base plate 310 to the first position, generally parallel with the bottom portion 312 of the tray 330. At the predetermined weight, the biasing member 314 may move the base plate 310 toward the second position. As liquid or substance is removed from the receptacle 323, the base plate 310 may approach and reach the second position.

A tray 430 configured to adjust the positioning of a flavoring receptacle 323 placed therein as content is removed from the receptacle 323 is shown in FIGS. 24-27. The tray 430 may include a floor 412, a plurality of walls 417 extending from the floor and a base plate 410 pivotally attached with the floor 412. While four walls 417 are shown and described, it should be understood that any number of walls 417 may be utilized, including, without limitation, one, two or three.

The tray 430 may further include an aperture 420 configured to receive a receptacle spout 327. In such embodiments, the base plate 410 is configured such that as it pivots, the angle of the receptacle 323 may change to assist in evacuating substantially all of the liquid from the receptacle 323 through the opening 420.

The base plate 410 may be movable between at least first and second positions. The first position may be generally parallel to the floor 412 and the second position may be at an angle of approximately between 0-90 degrees from parallel with the floor 412. In an embodiment, the second position may be approximately 25 degrees from parallel with the floor 412.

The base plate 310 may be biased toward the second position. For example, the tray 330 may include a biasing member 421, such as a spring, elastic band, or any appropriate biasing mechanism—the present teachings are not limited to the configurations shown and described herein. The biasing member 421 may be configured bias the base plate 410 to a predetermined angle and configured to allow the base plate 410 move toward the first position in response to a weight applied to the base plate 410 and to move away from the floor 412 as weight is removed from the base plate 410.

Figure 25:
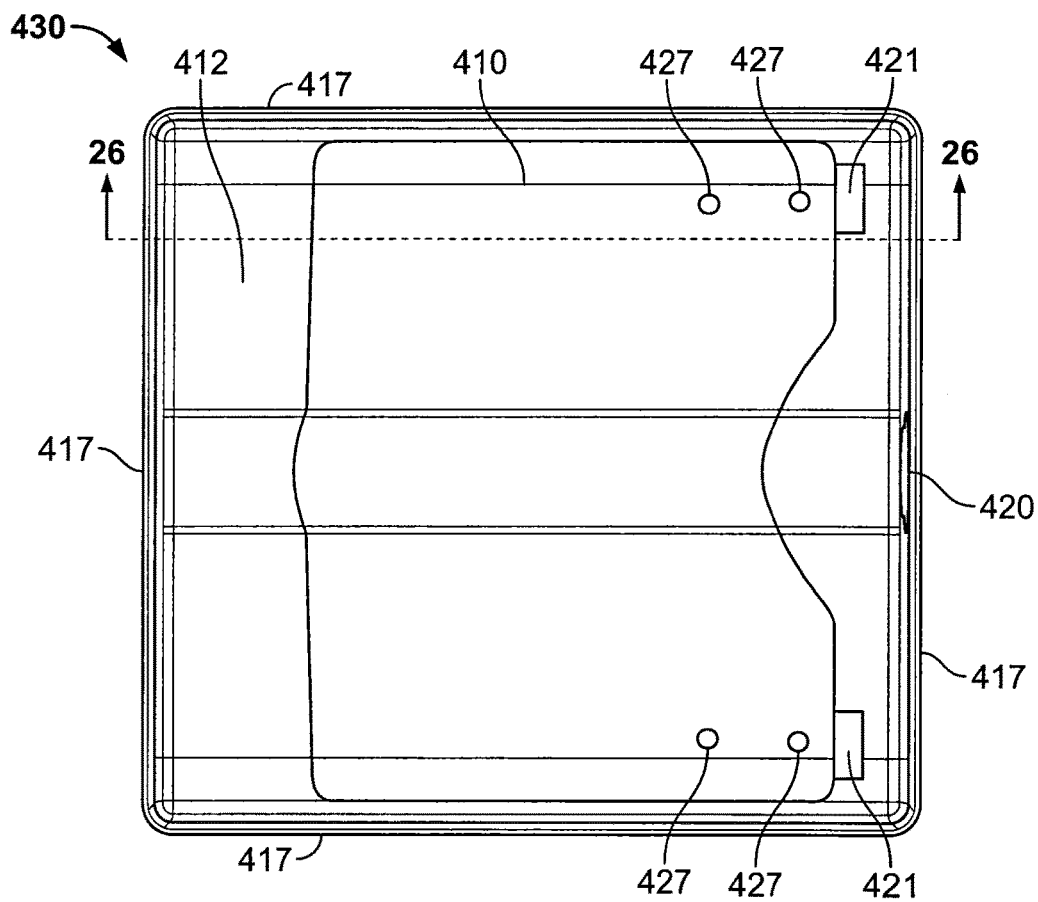
FIG. 25 is a top view of the tray of FIG. 24.
Figure 26:
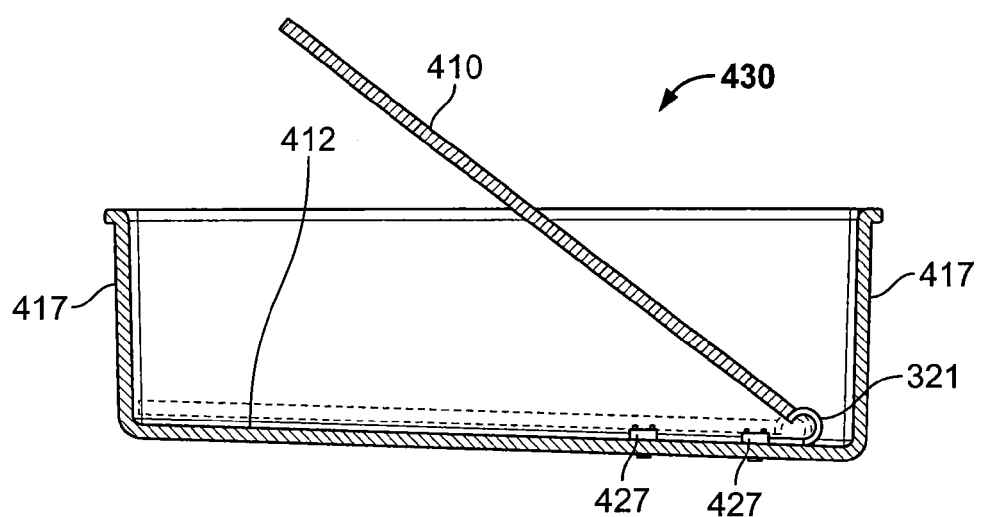
FIG. 26 is a cross-sectional view of the tray of FIG. 25 taken along line A-A.
Figure 27:
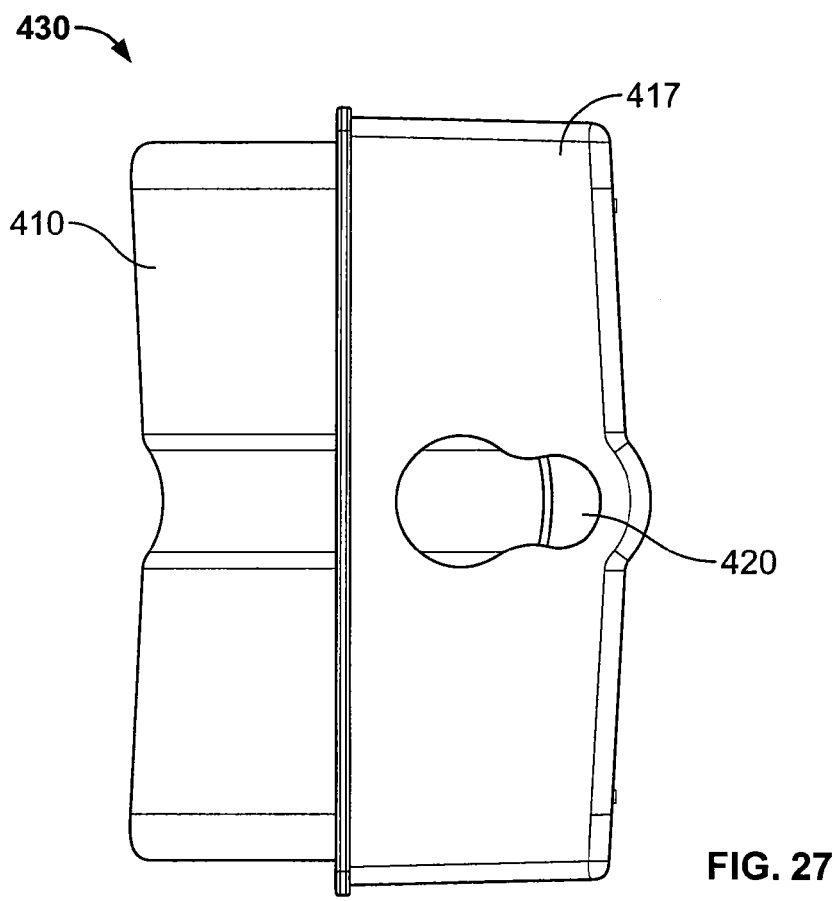
FIG. 27 is a front view of the tray of FIG. 24.

As shown in FIG. 25, the biasing member 421 may comprise a leaf spring or a plurality of leaf springs such as the two shown in FIG. 25. The leaf spring 421 may be attached on a first end to the floor 412 of the tray 430 and on a second end to the base plate 410. Fasteners 427 may be utilized to attach the leaf spring 421. The leaf spring 421 may bias away from the floor 412. However, then the receptacle 323 is placed in the tray 430 the weight of the receptacle 323 overcomes some or all of the biasing force of the leaf spring forcing the base plate 410 to move to the first position, generally parallel with the bottom portion 412. As liquid is removed from the receptacle 323 and the weight of the receptacle 323 is reduced, the biasing force of the leaf spring 421 may overcome to a predetermined amount the weight of the remaining liquid in the receptacle 323. This may allow the base plate 310 to pivot toward the angled second position and assist with evacuating liquid from the receptacle 323.

Although the embodiments have been illustrated in the accompanying drawings and described in the foregoing detailed description, it is to be understood that the system is not to be limited to just the embodiments disclosed, but that the system described herein is capable of numerous rearrangements, modifications and substitutions.

The invention claimed is:

1. A modular blending system comprising:
  a storage device comprising a housing capable of storing a plurality of flavoring products, the housing comprising a top surface, the top surface comprising at least one first attachment mechanism;
  an ice shaving mechanism including an ice dispenser and at least one second attachment mechanism, wherein the at least one first attachment mechanism selectively engages with the at least one second attachment mechanism to removably attach the ice shaving mechanism to the top surface of the housing;
  a fluid dispensing unit in fluid communication with the flavoring products, wherein the fluid dispensing unit comprises a nozzle that operatively expels the flavoring products, wherein the nozzle is separate from the ice dispenser, and wherein the fluid dispensing unit is disparately detachable from the storage device relative to the ice shaving mechanism; and
  a blender comprising a blender housing that houses a motor, wherein the blender housing is selectively attachable with the top surface of the housing, the blender juxtaposed the ice shaving mechanism when attached with the top surface,
  wherein the storage device, blender and ice shaving mechanism are operable when at least one of the blender or the ice shaving mechanism is selectively detached from the top surface.

2. The modular blending system of claim 1, wherein the storage device is refrigerated.

3. The modular blending system of claim 1, further comprising:

a support removably attached with the top surface of the housing;
a blender container comprising a blade assembly, wherein the blender container is removably engaged with the support in an operative position, and wherein the blender container may receive contents from at least one of the ice shaving mechanism and fluid dispensing unit.

4. The modular blending system of claim 3, further comprising a container cleaner adjacent the support.

5. The modular blending system of claim 1, further comprising an ice shaver housing, wherein at least a portion of the ice shaving mechanism is positioned within the ice shaver housing.

6. The modular blending system of claim 5, further comprising an ice shoot extending from the ice shaver housing and operatively coupled with the ice shaving mechanism.

7. The modular blending system of claim 6, further comprising a water dispenser extending from the ice shaver housing in proximity to the ice shoot.

8. The modular blending system of claim 1, further comprising a water dispenser, wherein the water dispenser is separate from the fluid dispensing unit.

9. The modular blending system of claim 1, further comprising a plurality of casters operatively coupled with the storage device, wherein the casters configured to position the storage device upon application of a predetermined force.

10. The modular blending system of claim 1, further comprising at least one tray engaged with the storage device, wherein the tray is configured to operatively position a dispensing unit within the storage device.

11. The modular blending system of claim 10, further comprising a pumping system fluidly engaged between the at least one tray and the fluid dispensing unit, wherein the pumping system is configured to move contents of a dispensing unit from the tray to the fluid dispensing unit.

12. The modular blending system of claim 1, further comprising:
a central processing unit operatively coupled with the storage device, the ice shaving mechanism and the fluid dispensing unit; and
a graphical user interface operatively coupled with the central processing unit, the graphical user interface configured to operate at least one of the storage device, ice shaving mechanism and the fluid dispensing unit.

13. The modular blending system of claim 12, wherein the graphical user interface is configured to manually operate at least one of the storage device, ice shaving mechanism and the fluid dispensing unit.

14. The modular blending system of claim 12, wherein the graphical user interface is configured to automatically operate at least one of the storage device, ice shaving mechanism and the fluid dispensing unit.

15. The modular blending system of claim 12, wherein the graphical user interface is configurable to automatically operate at least one of the storage device, ice shaving mechanism and the fluid dispensing unit in a predetermined manner.

16. A modular blending system comprising:
a refrigeration unit comprising a top panel and at least two attachment members disposed on the top panel;
an ice shaving mechanism selectively secured to the top panel of the refrigeration unit, the ice shaving mechanism including an ice dispenser;
a blender comprising a blender base comprising a housing that houses a motor, wherein the housing is selectively secured to the top panel of the refrigeration unit, and wherein the blender is operable when the housing is selectively detached from the top panel of the refrigeration unit; and
a fluid dispensing unit in fluid communication with the refrigeration unit, wherein the fluid dispensing unit is separate from the ice dispenser,
wherein the at least two attachment members selectively secure the ice shaving mechanism and the housing to the top surface.

17. The modular blending system of claim 16, a water dispensing member selectively secured to the top panel of the refrigeration unit.

18. The modular blending system of claim 17, wherein the water dispensing member is integral with the ice shaving mechanism.

19. The modular blending system of claim 17, further comprising a support in operative communication with the fluid dispensing unit, ice shaving mechanism and the water dispenser.

20. The modular blending system of claim 19, wherein the blender is adjacent the support.

21. The modular blending system of claim 19, wherein the support is selectively secured with the top panel of the refrigeration unit.

22. The modular blending system of claim 16, further comprising a graphical user interface, the graphical user interface in operative communication with the refrigeration unit, the ice shaving mechanism, the blender and the fluid dispensing unit.

23. The modular blending system of claim 22, wherein the graphic user interface is programmable to operate at least one of the ice shaving mechanism, blender and fluid dispensing unit without human intervention.

24. The modular blending system of claim 22, wherein the graphical user interface is programed to indicate maintenance requirements for at least one of the ice shaving mechanism, blender and fluid dispensing unit.

25. A modular blending system comprising:
a refrigeration unit comprising a first housing having a top surface that is planar;
an ice shaving mechanism selectively secured to the top surface of the refrigeration unit, the ice shaving mechanism including a second housing and an ice dispenser;
a blender comprising a blender base comprising a third housing that houses a motor, wherein the third housing is selectively secured to the top surface of the refrigeration unit, and wherein the blender is operable when the third housing is selectively detached from the refrigeration unit;
a fluid dispensing unit in fluid communication with the refrigeration unit, wherein the fluid dispensing unit is separate from the ice dispenser;
at least one tube fluidly engaged with the fluid dispensing unit at one end and configured to fluidly engage with a dispensing receptacle at a second end wherein fluid foodstuff from the dispensing receptacle is operatively transferred through the at least one tube to the fluid dispensing unit; and
a cleaning system operatively coupled with the fluid dispensing unit and the tube, wherein the cleaning system is configured to operatively clean the at least one tube of the fluid foodstuff, and wherein the cleaning system utilizes gravity to evacuate the at least one tube of cleaning fluids.

26. The modular blending system of claim 25, further comprising a pumping unit, the pumping unit in fluid communication with the cleaning system and the at least one tube wherein the pumping unit is configured to pump contents in at least two directions within a tube of the at least one tube.

27. The modular blending system of claim 25, wherein the cleaning system includes at least one fixture selectively securable to the at least one tube.

28. The modular blending system of claim 27, wherein the cleaning system includes at least one cleaning tube, the at least one cleaning tube selectively securable to the fixture at a first end and insertable into a cleaning solution at a second end.

29. The modular blending system of claim 25, wherein the cleaning system is positioned below the fluid dispensing unit.

30. The modular blending system of claim 28, wherein a majority portion of the at least one tube is positioned above the cleaning system.

\* \* \* \* \*